US009667861B2

(12) United States Patent
Lee et al.

(10) Patent No.: US 9,667,861 B2
(45) Date of Patent: May 30, 2017

(54) METHOD OF DISPLAYING FOCUS AND ELECTRONIC DEVICE APPLYING THE SAME

(71) Applicant: Samsung Electronics Co., Ltd., Suwon-si, Gyeonggi-do (KR)

(72) Inventors: Woo-Yong Lee, Hwaseong-si (KR); Dong-Hoon Jang, Suwon-si (KR); Ki-Huk Lee, Yongin-si (KR); Yun-Sik Choo, Yongin-si (KR)

(73) Assignee: Samsung ELectronics Co., Ltd., Suwon-si (KR)

( * ) Notice: Subject to any disclaimer, the term of this patent is extended or adjusted under 35 U.S.C. 154(b) by 33 days.

(21) Appl. No.: 14/591,447

(22) Filed: Jan. 7, 2015

(65) Prior Publication Data

US 2015/0244929 A1 Aug. 27, 2015

(30) Foreign Application Priority Data

Feb. 21, 2014 (KR) .................. 10-2014-0020969

(51) Int. Cl.
*H04N 5/232* (2006.01)
*G03B 13/36* (2006.01)

(52) U.S. Cl.
CPC ......... *H04N 5/23222* (2013.01); *G03B 13/36* (2013.01); *H04N 5/23203* (2013.01); *H04N 5/23212* (2013.01); *H04N 5/23293* (2013.01)

(58) Field of Classification Search
CPC .............. H04N 5/232; H04N 5/23222; H04N 5/23212; H04N 5/23293; G03B 13/36
See application file for complete search history.

(56) References Cited

U.S. PATENT DOCUMENTS

| 6,937,284 | B1 * | 8/2005 | Singh ................. | H04N 5/23212 348/346 |
| 8,711,273 | B2 * | 4/2014 | Hamada ................. | G02B 7/102 348/333.02 |
| 2007/0092141 | A1 | 4/2007 | Hagino | |
| 2013/0182140 | A1 * | 7/2013 | Yasuda .............. | H04N 5/23212 348/222.1 |

FOREIGN PATENT DOCUMENTS

KR 10-2005-0105203 A 11/2005

* cited by examiner

*Primary Examiner* — Tuan Ho
(74) *Attorney, Agent, or Firm* — Jefferson IP Law, LLP

(57) ABSTRACT

An electronic device is provided. The electronic device includes a camera module, and a camera control module operatively connected to the camera module, wherein the camera control module obtains focus information of a subject to be captured by using the camera module, moves a lens of a camera to focus the camera on the subject based on at least the focus information, and provides guide information corresponding to the movement of the lens through an output device operatively connected to the electronic device.

22 Claims, 12 Drawing Sheets

METHOD OF DISPLAYING FOCUS AND ELECTRONIC DEVICE APPLYING THE SAME

CROSS-REFERENCE TO RELATED APPLICATION(S)

This application claims the benefit under 35 U.S.C. §119 (a) of a Korean patent application filed on Feb. 21, 2014 in the Korean Intellectual Property Office and assigned Serial number 10-2014-0020969, the entire disclosure of which is hereby incorporated by reference.

TECHNICAL FIELD

The present disclosure relates to a method and an apparatus for displaying an auto focus detected when an image is photographed.

BACKGROUND

Recently, user terminals such as electronic devices (e.g., a mobile device, a mobile phone, a smart phone, and a tablet Personal Computer (PC)) have one or more cameras and provide a function of photographing an image such as a still picture or a moving picture by using the one or more cameras.

The function of photographing the image provides a function of automatically detecting a focus of the image. As a method of automatically detecting a focus of an image, a contrast detection method is widely used.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to visualize and display an operation of detecting an auto focus of an image.

Another aspect of the present disclosure is to visualize and display in real time an auto focus detecting operation by using information obtained in the operation of detecting the auto focus of the image.

In accordance with an aspect of the present disclosure, an electronic device is provided. The electronic device includes a camera module, and a camera control module operatively connected to the camera module, wherein the camera control module is configured to obtain focus information of a subject to be captured by using the camera module, to move a lens of a camera to focus the camera on the subject based on at least the focus information, and to provide guide information corresponding to the movement of the lens through an output device operatively connected to the electronic device.

In accordance with an aspect of the present disclosure, a method is provided. The method includes obtaining focus information of a subject to be captured by using a camera operatively connected to an electronic device, moving a lens of the camera to focus the camera on the subject based on at least the focus information, and providing guide information corresponding to the movement of the lens through an output device operatively connected to the electronic device.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

Figure 1A:
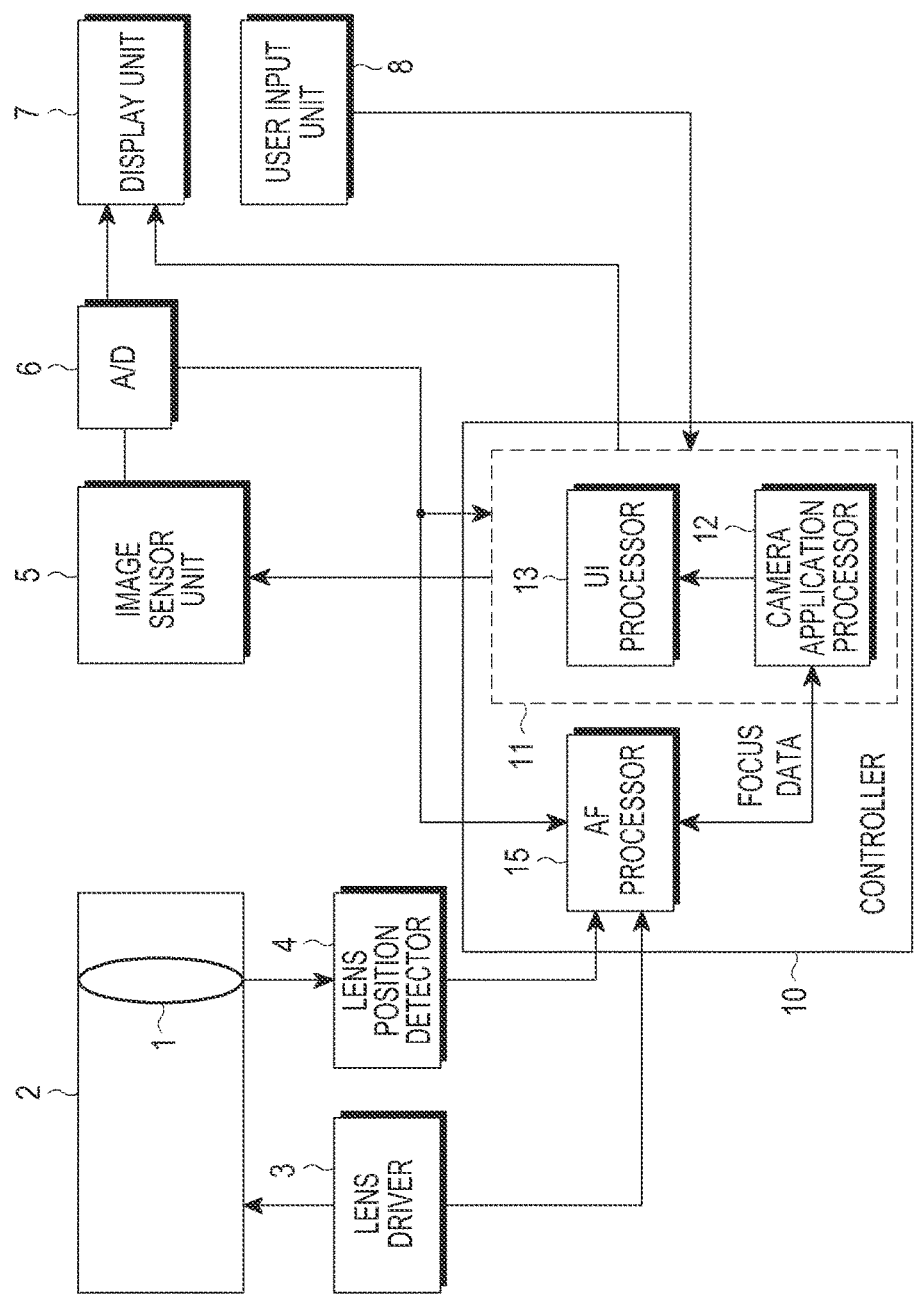
FIG. 1A is a block diagram illustrating an electronic device according to an embodiment of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

The term "include" or "may include" refers to the existence of a corresponding disclosed function, operation or component which can be used in various embodiments of the present disclosure and does not limit one or more additional functions, operations, or components. The terms such as "include" and/or "have" may be construed to denote a certain characteristic, number, step, operation, constituent element, component or a combination thereof, but may not be construed to exclude the existence of or a possibility of addition of one or more other characteristics, numbers, steps, operations, constituent elements, components or combinations thereof.

The term "or" used in various embodiments of the present disclosure includes any or all of combinations of listed words. For example, the expression "A or B" may include A, may include B, or may include both A and B.

The expression "1", "2", "first", or "second" used in various embodiments of the present disclosure may modify various components of various embodiments but does not limit the corresponding components. For example, the above expressions do not limit the sequence and/or importance of the elements. The expressions may be used for distinguishing one component from other components. For example, a first user device and a second user device indicate different user devices although both of them are user devices. For example, without departing from the scope of the present disclosure, a first structural element may be named a second structural element. Similarly, the second structural element also may be named the first structural element.

When it is stated that a component is "coupled to" or "connected to" another component, the component may be directly coupled or connected to another component or a new component may exist between the component and another component. In contrast, when it is stated that a component is directly "coupled to" or "connected to" another component, a new component does not exist between the component and another component.

The terms used in various embodiments of the present disclosure are only examples for describing a specific embodiment but do not limit the various embodiments of the present disclosure. Singular forms are intended to include plural forms unless the context clearly indicates otherwise.

Unless defined differently, all terms used herein, which include technical terminologies or scientific terminologies, have the same meaning as that understood by a person skilled in the art to which the present disclosure belongs. Such terms as those defined in a generally used dictionary are to be interpreted to have the meanings equal to the contextual meanings in the relevant field of art, and are not to be interpreted to have ideal or excessively formal meanings unless clearly defined in the present disclosure.

An electronic device according to various embodiments of the present disclosure may be a device having a camera function. For example, the electronic device may include at least one of a smart phone, a tablet Personal Computer (PC), a mobile phone, a video phone, an e-book reader, a desktop PC, a laptop PC, a netbook computer, a PDA, a Portable Multimedia Player (PMP), an MP3 player, a mobile medical device, a camera, a wearable device (e.g., a Head-Mounted-Device (HMD) such as electronic glasses, electronic clothes, an electronic bracelet, an electronic necklace, an electronic accessory, an electronic tattoo, and a smart watch.

According to various embodiments of the present disclosure, the electronic device may be a smart home appliance with a camera function. The smart home appliance as an example of the electronic device may include at least one of a television, a Digital Video Disk (DVD) player, an audio, a refrigerator, an air conditioner, a vacuum cleaner, an oven, a microwave oven, a washing machine, an air cleaner, a set-top box, a TV box (e.g., Samsung HomeSync™, Apple TV™, or Google TV™), a game console, an electronic dictionary, an electronic key, a camcorder, and an electronic picture frame.

According to various embodiments of the present disclosure, the electronic device may include at least one of various types of medical devices (e.g., Magnetic Resonance Angiography (MRA), Magnetic Resonance Imaging (MRI), Computed Tomography (CT), a scanning machine, ultrasonic wave device and the like), a navigation device, a Global Positioning System (GPS) receiver, an Event Data Recorder (EDR), a Flight Data Recorder (FDR), a car infotainment device, ship electronic equipment (e.g., navigation equipment for a ship, a gyro compass and the like), avionics, a security device, a head unit for a vehicle, an industrial or home robot, an Automatic Teller Machine (ATM) of a financial institution, and a Point Of Sales (POS) of a shop.

According to various embodiments of the present disclosure, the electronic device may include at least one of furniture or a part of a building/structure, an electronic board, an electronic signature receiving device, a projector, and various types of measuring devices (e.g., a water meter, an electric meter, a gas meter, a radio wave meter and the like) including a camera function.

The electronic device according to various embodiments of the present disclosure may be one of the above described various devices or a combination thereof. Further, the electronic device according to various embodiments of the present disclosure may be a flexible device. It is apparent to those skilled in the art that the electronic device according to various embodiments of the present disclosure is not limited to the above described devices.

Hereinafter, the electronic device according to various embodiments will be described with reference to the accompanying drawings. The term "user" used in various embodiments may refer to a person who uses an electronic device or a device (e.g., an artificial intelligence electronic device) which uses an electronic device.

FIG. 1A is a block diagram illustrating an electronic device according to an embodiment of the present disclosure.

Referring to FIG. 1A, components of the electronic device are not limited to components of an electronic device illustrated in FIG. 1A and it is apparent that the electronic device is applicable to various embodiments of the present disclosure that process a digital image by using a camera device.

General operations of the electronic device according to various embodiments of the present disclosure may be controlled by a controller 10. The controller 10 may initiate or terminate an operation of the electronic device by controlling supply of power to components included within the electronic device. Particularly, the controller 10 may control an operation of a component prepared in the electronic device to photograph an image. A detailed control function and operation of the controller 10 will be described below.

The electronic device may be or otherwise include a component for photographing an image and may include at least one lens 1 and a lens assembly 2 providing a movement path to allow the lens 1 to move on an optical axis. Further, the electronic device may include a lens driver 3 providing a control signal to allow the lens 1 to move within the lens assembly 2. In addition, the electronic device may include a lens position detector 4 for detecting a position of the lens 1 within the lens assembly 2. For example, the lens assembly 2, the lens driver 3, and the lens position detector 4 may be based on a scheme using a stepping motor or a Voice Coil Module (VCM) scheme.

An image sensor unit 5 may generate data from light incident through the lens assembly 2 and an A/D converter 6 may convert analog data output from the image sensor unit 5 to digital data. Although various embodiments of the present disclosure has described that the image sensor unit 5 and the A/D converter 6 are separated from each other, various embodiments of the present disclosure are not limited thereto and the A/D converter 6 may be included within the image sensor unit 5.

The data output from the A/D converter 6 is provided to the controller 10 to process an image or provided to a display unit 7 to display an image (e.g., displaying a preview image). A user input unit 8 may process an operation of generating a user input as an electrical signal. For example, the user input unit 8 may include a hardware button (not shown) included in the electronic device, and may provide a user input signal to the controller 10 as an input (e.g., pressing) is generated on the hardware button. Alternatively or in addition, the user input unit 8 may include a touch screen (not shown) configured to overlap the display unit 7. For example, as a button having a predetermined shape is displayed on the display unit 7 and a touch input is generated on the button having the predetermined shape, the user input unit 8 may include a software button providing a user input signal.

Figure 1B:
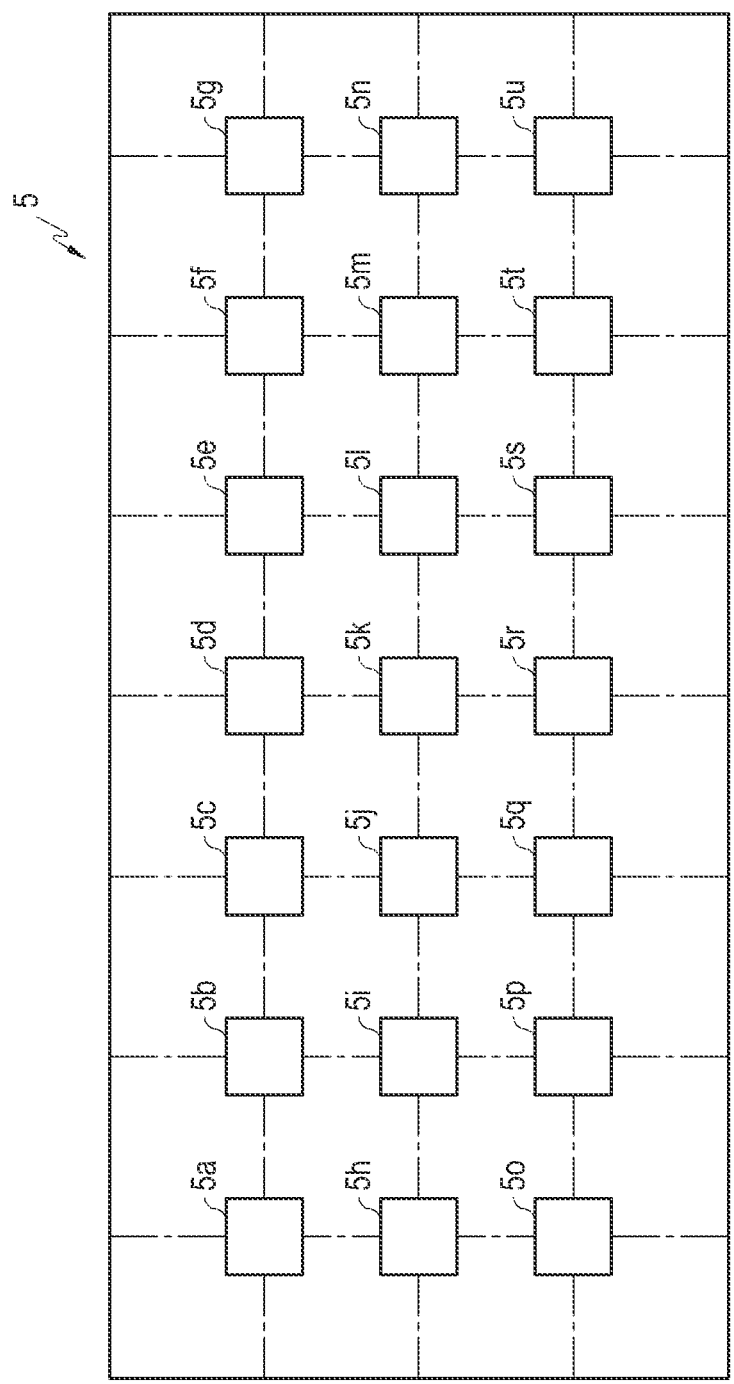
FIG. 1B illustrates an example of a configuration of an image sensor unit included in an electronic device according to an embodiment of the present disclosure.

FIG. 1B illustrates an example of a configuration of the image sensor unit 5 included in the electronic device according to an embodiment of the present disclosure.

Referring to FIG. 1B, the image sensor unit 5 may include a plurality of phase difference sensors 5a to 5u. The phase difference sensors 5a to 5u may be combined with a plurality of image sensors included in the image sensor unit 5 and may be located at a predetermined area to detect a focus. For example, the plurality of phase difference sensors 5a to 5u may be configured in a matrix form (e.g., 7×3). The plurality of phase difference sensors 5a to 5u are sufficient if the plurality of phase difference sensors 5a to 5u can obtain data for detecting a focus. According to various embodiments of the present disclosure, the phase difference sensors 5a to 5u can be variously changed by those skilled in the art.

Each of the plurality of phase difference sensors 5a to 5u may include a separate lens and provide a plurality of pieces of phase data separated by the separate lens. Particularly, the plurality of pieces of phase data generated by the plurality of phase difference sensors 5a to 5u correspond to information used for detecting a focus by a phase difference focus detecting scheme and may be used as focus information. For example, the focus information may include phase difference values provided by the plurality of phase difference sensors 5a to 5u. The plurality of pieces of phase data may be provided to the controller 10 (particularly, AF processor 15) through the A/D converter 6. Further, operations of the plurality of phase difference sensors 5a to 5u may be controlled by the controller 10 (particularly, AF processor 15) for processing a focus detection. A detailed control operation of the plurality of phase difference sensors 5a to 5u by the controller 10 (particularly, AF processor 15) processing the focus detection may be referred to the following description.

According to various embodiments of the present disclosure, the controller 10 may include a camera controller 11 controlling an operation for photographing an image. As a request for executing a camera application is made, the camera controller 11 may initiate the operation. The camera controller 11 may make a request for an auto focus detecting operation to the Auto Focus (AF) processor 15. In response to the request, the AF processor 15 may control operations of the lens driver 3, the lens position detector 4, and the image sensor unit 5 to detect an auto focus of image data input through the image sensor unit 5 and the A/D converter 6. For example, the AF processor 15 may identify (e.g., determine) a plurality of pieces of focus information (e.g., phase difference values) provided from the plurality of phase difference sensors 5a to 5u based on the position of the lens 1 (hereinafter referred to as an "initial lens position") in an initial process of initiating an image photographing operation of the electronic device. Further, the AF processor 15 may estimate a lens position (hereinafter referred to as a "first lens position") corresponding to a designated area (e.g., an image center area, a main subject area, an area designated by a user input, and/or the like) based on a plurality of pieces of focus information. The AF processor 15 may identify (e.g., determine) a relation between the initial lens position and the estimated first lens position, and also identify (e.g., determine) information (hereinafter referred to as "lens movement information") used (e.g., required) for moving the initial lens position to the estimated first lens position based on the identified (e.g., determined) relation. For example, the lens movement information may include at least one of a movement direction of the lens, a movement distance of the lens, a movement speed of the lens, and/or the like. The AF processor 15 may move the lens to the estimated first lens position by using the lens movement information.

Additionally, after the lens is moved to the first lens position, the AF processor 15 may process a focus detecting operation by performing a focus detection in a contrast scheme.

Further, the AF processor 15 may provide focus information or lens movement information (e.g., movement direction of the lens, movement distance of the lens, movement speed of the lens, and/or the like) obtained in an operation of configuring the auto focus to the camera controller 11. The camera controller 11 may generate a focus movement displaying User Interface (UI) for displaying the lens movement and provide the generated focus movement displaying UE to the display unit 7 by using the focus information or the lens movement information (e.g., movement direction of the lens, movement distance of the lens, movement speed of the lens, and/or the like) obtained in the operation of configuring the auto focus.

The camera controller 11 may include a camera application processor 12 and a User Interface (UI) processor 13. The camera application processor 12 may process an operation of the camera application and the UI processor 13 may generate a UI used in the operation of the camera application. The UI processor 13 may provide the generated UI to the display unit 7, receive a user input related to the UE to the user input unit 8, and provide the corresponding user input to the camera application processor 12.

Figure 2:
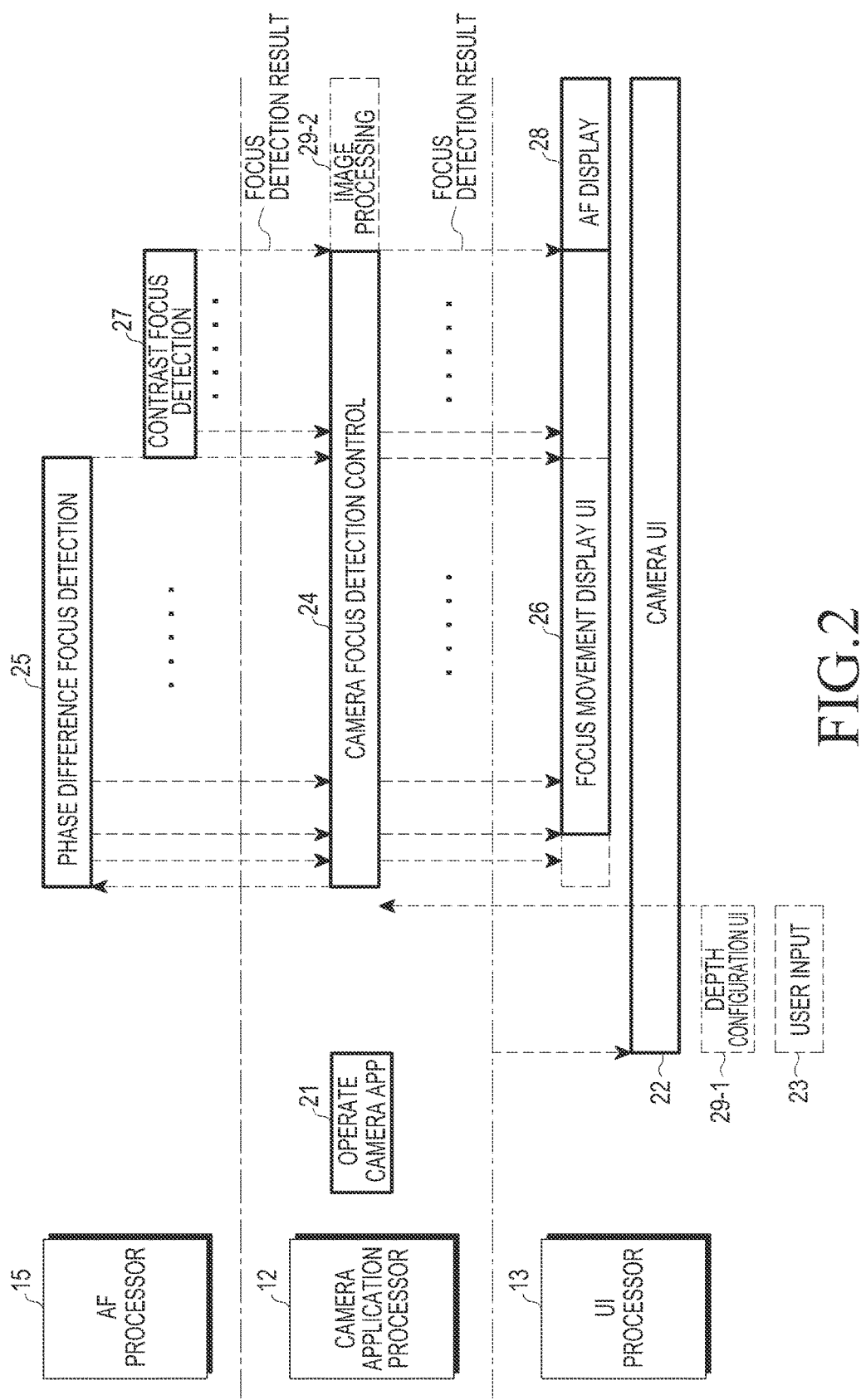
FIG. 2 illustrates an operation of a controller included in an electronic device according to an embodiment of the present disclosure.

FIG. 2 illustrates an operation of the controller included in the electronic device according to an embodiment of the present disclosure.

Referring to FIG. 2, operations of the camera application processor 12, the UI processor 13, and the AF processor 15 included in the controller 10 are illustrated.

The camera application processor 12 provides a camera application operation as indicated by a reference numeral 21. For example, as a request for the camera application operation is made, the camera application processor 12 may provide operations of the image sensor unit 5 and the A/D converter 6 and output image data (e.g., preview image data) provided through the image sensor unit 5 and the A/D converter 6 to the display unit 7. Further, the camera application processor 12 may instruct the UI processor 13 to provide a camera UI 22. Accordingly, the UI processor 13 may generate the camera UI including a menu or a photographing button basically provided while the camera application is executed and provide the generated camera UI to the display unit 7. Then, the display unit 7 may display the camera UI together with the preview image data.

The camera application processor 12 may process a camera focus detection controlling operation 24. For example, the camera application processor 12 may transmit a control signal for instructing a camera focus detection to the AF processor 15. For example, the camera application processor 12 may transmit the control signal for instructing the camera focus detection to the AF processor 15 in response to a user input. According to various embodiments of the present disclosure, the AF processor 15 may perform the focus detection by a phase difference detection scheme 25. For example, the AF processor 15 may control to operate the plurality of phase difference sensors 5a to 5u based on the initial lens positions in the initial process of initiating the image photographing of the electronic device and identify (e.g., determine) a plurality of pieces of phase data provided from the plurality of phase difference sensors 5a to 5u.

According to various embodiments of the present disclosure, the AF processor 15 may identify focus information (e.g., difference between phases of the phase difference sensors, and/or the like) of subjects corresponding to areas at which the plurality of phase difference sensors 5a to 5u are located and configure an image depth map using the focus information on the subject. For example, the AF processor 15 may obtain a relative distance between subjects based on the difference between the phases of the plurality of phase difference sensors 5a to 5u and configure the image depth map based on the obtained relative distance. The AF processor 15 may estimate a first lens position corresponding to a designated area (e.g., image center area, area designated by a user input, and/or the like) based on a plurality of pieces of phase data and distance information of the subject. Further, the AF processor 15 may identify (e.g., determine) a relation between the initial lens position and the estimated first lens position and determine a movement direction, a movement distance, and a movement speed of the lens from the initial lens position to the estimated first lens position based on the relation. In addition, the AF processor 15 may move the lens 1 to the estimated first lens position to reflect the movement direction, movement distance, and movement speed of the lens by controlling the lens driver 3 and the lens position detector 4. Through such operations, the AF processor 15 may complete the phase difference detecting operation.

According to various embodiments of the present disclosure, after moving the lens 1 to the estimated first lens position, the AF processor 15 may further perform the phase difference detecting operation. The AF processor 15 may identify (e.g., determine) focus information based on the first lens position by controlling the lens driver 3 and the lens position detector 4. For example, the AF processor 15 may move the lens 1 in the unit of predetermined distances (e.g., phase difference focus detection distances) based on the first lens position as a reference point. In the operation, the AF processor 15 may identify (e.g., determine) focus information provided by (at least one of) the plurality of phase difference sensors 5a to 5u at every position at which the lens 1 moves. The AF processor 15 may identify (e.g., determine) focus information at a changed lens position to determine a focused position (e.g., a lens position indicating phase data of a largest value, for example, a phase difference focus lens position) of the designated area (e.g., image center area, area designated by the user input, and/or the like) and control the lens to be located at the corresponding position.

According to various embodiments of the present disclosure, the AF processor 15 may perform the phase difference focus detecting operation by using only focus information corresponding to the designated area (e.g., image center area, area designated by the user input, and/or the like) among the focus information. For example, the AF processor 15 may control to selectively drive only at least one phase sensor located at a position corresponding to the designated area (e.g., image center area, area designated by the user input, and/or the like) among the plurality of phase difference sensors 5a to 5u and perform the phase difference focus detecting operation by using at least one focus information (e.g., phase difference value) provided from the selectively driven at least one phase difference sensor. Further, according to various embodiments of the present disclosure, the AF processor 15 drives the plurality of phase difference sensors 5a to 5u, but may selectively obtain only focus information (e.g., phase difference value) input by the phase difference sensor located at a position corresponding to the designated area (e.g., image center area, area designated by the user input, and/or the like), so as to perform the phase difference focus detecting operation.

According to various embodiments of the present disclosure, the camera application processor 12 may receive the focus information or the lens movement information (e.g., lens movement direction, lens movement distance, lens movement speed, and/or the like) from the AF processor 15 in the camera focus detection controlling operation, for example, in the focus detecting operation of the AF processor 15. In response to the reception of the information (e.g., the focus information, the movement information, and/or the like), the camera application processor 12 may instruct the UI processor 13 to provide a UI corresponding to the focus using the focus information or the lens movement information. The UI processor 13 generates or controls the UI (hereinafter referred to as a "UI corresponding to a focus") corresponding to a focus using the focus information or the lens movement information and displays the UI on the display unit 7 as indicated by a reference numeral 26.

According to various embodiments of the present disclosure, the UI processor 13 may display the UI corresponding to the focus to reflect information related to the focus detection (e.g., lens trace) by using the focus information or the lens movement information detected in an operation of performing the focus detecting operation. For example, the UI processor 13 may display the UI corresponding to the focus based on at least one of an initial lens position, a plurality of pieces of focus information provided from the plurality of phase difference sensors 5a to 5u, distance information on a subject, an image depth map, and a position relation (direction, distance, and/or the like) between the initial lens position and a first lens position (e.g., a lens position estimated for a preset area such as a center area, an area designated by a user input, and/or the like). For example, the UI processor 13 may provide the UI corresponding to the UI focus corresponding to the focus to reflect a movement direction of the lens moving from the initial lens position to the first lens position and a distance from the initial lens position to the first lens position. According to various embodiments of the present disclosure, the UI processor 13 may differently display the UI corresponding to the focus according to a movement direction of the lens. For example, when the lens moves in a first direction (e.g., a direction in which the image sensor is located), the UI processor 13 may display such that the UI corresponding to the UI focus corresponding to the focus rotates in a clockwise direction (or counterclockwise direction). When the lens moves in a second direction (e.g., a direction in which the subject is located (e.g., a direction opposite to the direction in which the image sensor is located), the UI processor 13 may display such that the UI corresponding to the focus rotates in a counterclockwise direction (or clockwise direction). Further, the UI processor 13 may configure and display a rotation speed or a rotation angle of the UI corresponding to the focus in proportion to a size of the distance between the initial lens position and the first lens position.

According to various embodiments of the present disclosure, after the initial process of initiating the image photographing process is completed, the AF processor 15 may identify (e.g., determine) the focus information (e.g., phase difference value) while changing a position of the lens and provide the position of the lens (or a lens movement direction, a lens movement distance or the like) moving in the unit of phase difference focus detection distances and the focus information (e.g., phase difference value) to the camera application processor 12. Accordingly, the UI processor 13 may display a rotation direction, a rotation speed, and/or a rotation angle of the UI corresponding to the focus to reflect the position of the lens (or the lens movement direction, the lens movement distance, and/or the like) moving in the unit of phase difference focus detection distances and the focus information (e.g., phase difference value) provided from the camera application processor 12.

According to various embodiments of the present disclosure, after the phase difference focus detecting operation 25 is completed, the AF processor 15 may further perform the focus detecting operation by applying a contrast detection scheme based on the phase difference focus lens position identified (e.g., determined) in the phase difference focus detecting operation as indicated by a reference numeral 27. For example, the AF processor 15 may identify (e.g., determine) image data input through the image sensor unit 5 and the A/D converter 6 while moving the lens 1 in the unit of predetermined distances (e.g., a distance having a size relatively smaller than the phase difference focus detection distance, hereinafter referred to as a "contrast focus detection distance) within a range corresponding to the phase difference focus lens position by controlling the lens driver 3 and the lens position detector 4 and identify (e.g., determine) focus information of the image data. The image data may include an image value of a pixel corresponding to the preset area (e.g., center area, area designated by the user input, and/or the like). The AF processor 15 may detect a contrast value between pixels corresponding to the preset area (e.g., center area, area designated by the user input, and/or the like) as the focus information and determine a focus value of the image data by using the detected focus information (e.g., contrast value between the pixels). At this time, the AF processor 15 may configure an area in which the detected contrast value becomes a maximum value as a final focus area. The AF processor 15 moves a position of the lens 1 to a position (hereinafter referred to as a "contrast focus lens position") corresponding to the final focus area by controlling the lens driver 3 and the lens position detector 4 according to the configuration of the final focus area. The AF processor 15 may provide information indicating that the final focus area has been configured to the camera application processor 12.

The focus detecting operation by the contrast detection scheme 27 may be used to identify (e.g., determine) whether the focus identified (e.g., determined) through the phase difference focus detecting operation is accurately detected. For example, the AF processor 15 may determine that the focus detection of the final focus area fails when a contrast value of the final focus area is relatively smaller than a predetermined threshold and determine that the focus detection of the final focus area is successful when the contrast value of the final focus area is equal to or relatively larger than the predetermined threshold. The AF processor 15 may provide information on the success or failure of the focus detection to the camera application processor 12.

According to various embodiments of the present disclosure, after the phase difference focus detecting operation 25 is completed, the AF processor 15 can perform a contrast focus detecting operation 27. The focus information or lens movement information identified (e.g., determined) during the phase difference focus detecting operation and the focus information or lens movement information identified (e.g., determined) during the contrast focus detecting operation may be provided to the camera application processor 12. The camera application processor 12 may control a UI provided by the UI processor 13 in consideration of a time from a time point when the focus information or the lens movement information by the phase difference focus detecting operation is received to a time point when the focus information or the lens movement information by the contrast focus detecting operation is received. For example, when the time from the time point when the focus information or the lens movement information by the phase difference focus detecting operation 25 is received to the time point when the focus information or the lens movement information by the contrast focus detecting operation 27 is received exceeds a predetermined threshold, the camera application processor 12 may provide a signal instructing maintaining and providing the currently displayed UI corresponding to the focus to the UI processor 13. In contrast, when the time from the time point when the focus information or the lens movement information by the phase difference focus detecting operation 25 is received to the time point when the focus information or the lens movement information by the contrast focus detecting operation 27 is received does not exceed the predetermined threshold, the camera application processor 12 may provide a signal instructing to reflect the focus information or the lens movement information while providing the focus data by the contrast focus detecting operation to the UI processor 13. Accordingly, the UI processor 13 may display the UI corresponding to the currently displayed UI corresponding to the focus to reflect the focus data by the contrast focus detecting operation.

Through various embodiments of the present disclosure, the focus detecting operation has been described. For example, although it has been described that the phase difference detection scheme 25 and the contrast detection scheme 27 are sequentially performed, the focus detection scheme of the present disclosure is not limited thereto. The various embodiments of the present disclosure may be sufficient if the focus of the image is detected and focus data identified (e.g., determined) while the focus is detected is provided to the camera application processor 12.

According to various embodiments of the present disclosure, the focus detecting operation may include detecting the focus of the preset area (e.g., center area) or detecting the focus of the area designated by the user input. For example, after the camera application operation is initiated, the AF processor 15 may immediately perform the focus detecting operation of the area (e.g., center area) designated for the focus detection. Further, according to various embodiments of the present disclosure, when a user input is generated through the UI processor 13 after the camera application operation is initiated, the UI processor 13 may identify (e.g., determine) information (e.g., a coordinate of an area at which the user input is generated, a designated area selected by the user input, and/or the like) for identifying (e.g., determining) an area at which the user input is generated and provide the information for identifying (e.g., determining) the area at which the user input is generated to the AF processor 15 through the camera application processor 12, and the AF processor 15 may perform the focus detecting operation for the area at which the user input is generated.

In the focus detecting operation according to various embodiments of the present disclosure, for the displaying of the UI reflecting a lens trace moving in the focus detecting operation, two or more pieces of focus data used for identifying (e.g., determine) the lens trace may be used (e.g., required). Accordingly, after the two or more pieces of focus data are input from the AF processor 15, the UI processor 13 may provide the UI corresponding to the focus, reflecting the position of the lens included in the two or more pieces of focus data, to the display unit 7. Further, in another example, as a camera focus detection control is performed by the camera application processor 12, the UI processor 13 may provide the UI corresponding to the focus to the display unit 7, but fixedly display the UI corresponding to the focus without reflecting the lens trace. Thereafter, the UI processor 13 may display the UI corresponding to the focus to which the lens movement trace is reflected after two or more pieces of focus data are input from the AF processor 15. According to an embodiment, the UI processor 13 may additionally or alternatively receive information on the lens trace from the AF processor 15. For example, the UI processor 13 may receive information on a movement direction and a movement distance of the lens from the AF processor 15.

According to various embodiments of the present disclosure, the camera application processor 12 may receive information indicating that a final focus area is configured from the AF processor 15 and instruct the UI processor 13 to provide an AF display UI displaying the AF detection. Accordingly, the UI processor 13 generates the AF display UI displaying the AF detection and displays the generated AF display UI on the display unit 7 as indicated by a reference numeral 28.

The lens 1, the lens assembly 2, the image sensor unit 5, and the A/D converter 6 described by various embodiments of the present disclosure are components for generating image data from light reflected by the subject and may be components included in a camera or a camera module. The lens driver 3, the lens position detector 4, and the controller 10 are components for controlling an operation of the camera or the camera module and may be components included in a camera control module.

The electronic device according to various embodiments of the present disclosure includes a camera module and a camera control module functionally connected to the camera module. The camera module may obtain focus information of a subject to be captured, by using the camera module, move a lens of the camera to focus the camera on the subject based on at least focus information, and provide guide information corresponding to the movement of the lens through an output device (e.g., the display unit 7) functionally connected to the electronic device. For example, the guide information (e.g., UI corresponding to the focus) may be provided through an image, a text, an icon, a dynamic image, a vibration, a sound, and/or the like.

The camera module according to various embodiments of the present disclosure may include at least one phase difference focus sensor and the camera control module may obtain the focus information by using the phase difference focus sensor.

The camera control module according to various embodiments of the present disclosure may determine at least one of a movement distance, a movement direction, and a movement speed of the lens based on the focus information.

The camera control module according to various embodiments of the present disclosure may output an image corresponding to the guide information to the display unit and may output a different image according to at least one of the movement distance, movement direction, and movement speed corresponding to the lens.

The camera control module according to various embodiments of the present disclosure may rotate the image in a clockwise direction when the movement direction of the lens is a first direction, and rotate the image in a counterclockwise direction when the movement direction of the lens is a second direction.

The camera control module according to various embodiments of the present disclosure may output a different rotation amount according to the movement distance of the lens.

The camera control module according to various embodiments of the present disclosure may output a different rotation speed according to the movement distance of the lens. The camera control module according to various embodiments may output a different rotation speed according to the movement speed of the lens.

The output device according to various embodiments of the present disclosure may include a vibration module (e.g., an actuator or an electric stimulation module) and the camera control module may output a different vibration according to at least one of the movement direction, movement distance and movement speed of the lens. For example, when the movement direction of the lens is a first direction, the camera control module may perform an output such that an intensity of the vibration gradually becomes stronger. When the movement direction of the lens is a second direction, the camera control module may perform an output such that an intensity of the vibration gradually becomes weaker. For example, the camera control module may output the image with different various vibration attributes such as an intensity, a direction, and a pattern of the vibration. According to various embodiments of the present disclosure, the vibration module may output various vibrations such as a vibration, a pressure, an electrostatic vibration, and an electric stimulation using the actuator.

The output device according to various embodiments of the present disclosure may include an audio output module for outputting a sound and the camera control module may output a different sound according to at least one of the movement direction, movement distance and/or movement speed of the lens, and/or the like. For example, when the movement direction of the lens is a first direction, the camera control module may perform an output such that an intensity of the sound gradually becomes stronger. When the movement direction of the lens is a second direction, the camera control module may perform an output such that an intensity of the sound gradually becomes weaker. For example, the camera control module may output different various sound attributes such as a direction, an intensity, a pattern, and a tone of the sound.

The camera control module according to various embodiments of the present disclosure may determine a depth of field of at least one subject and output a different size image according to the depth of field.

The camera control module according to various embodiments of the present disclosure may determine the depth by using at least one of the focus information, aperture information, distance information, and/or the like between the camera control module and at least one subject.

The camera control module according to various embodiments of the present disclosure may control the depth of field of at least one subject in response to a user input for the image. The camera control module according to various embodiments of the present disclosure may control the aperture to control the depth of field or apply a blur image effect to at least one subject.

The electronic device according to various embodiments of the present disclosure may include at least one lens, an image sensor unit that converts light incident from the lens to image data, and a controller that obtains focus information of the image data, identifies (e.g., determines) movement information of the lens for focusing the camera on a focus area of the image data, and displays a User Interface (UI) corresponding to movement information of the lens through a display of the electronic device.

The controller may include an AF processor that detects a focus of the focus area by identifying (e.g., determining) movement information of the lens for focusing the camera on the focus area of the image data and controlling a position of the lens according to the movement information of the lens, a UI processor that generates a UI reflecting the movement information of the lens, and a camera application processor that controls an operation of the UI processor.

The movement information of the lens may include at least one of a movement distance of the lens, a movement direction of the lens, a movement speed of the lens, and/or the like.

The UI processor may include a UE reflecting at least one of a rotation direction of the UI according to the movement direction of the lens, a rotation amount of the image according to the movement speed of the lens, and a rotation speed of the image according to the movement speed of the lens.

The controller may identify (e.g., determine) the depth of field by using at least one of the focus information, the aperture information, and distance information of at least one subject included in the image data and process an operation of controlling the depth of field of the image data.

The controller may process an operation of controlling a size of the aperture included in the electronic device.

The controller may process an operation of applying a blur image effect to at least one subject included in the image data.

Figure 3A:
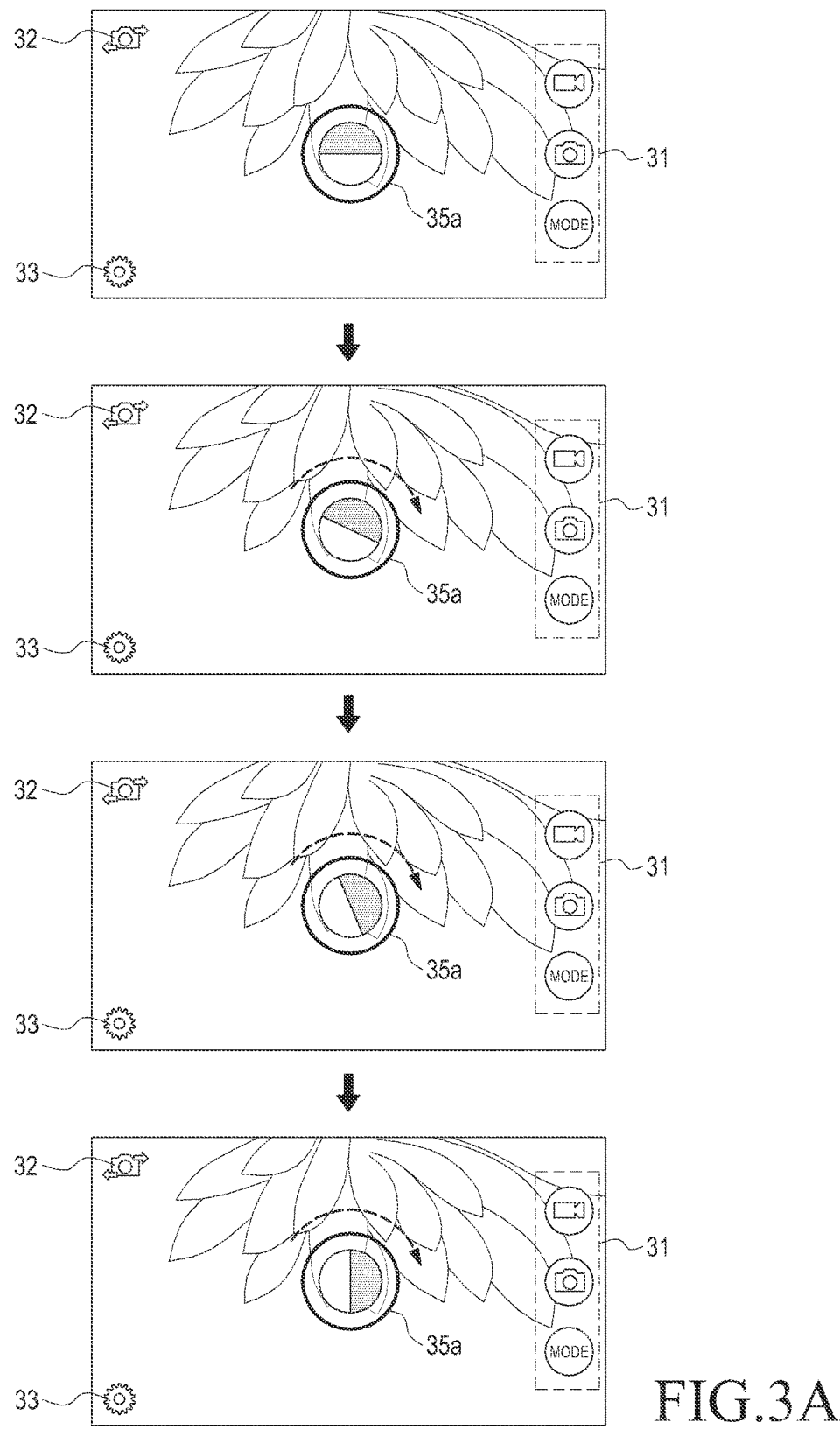
FIGS. 3A and 3B illustrate an example of a UI used in an electronic device according to an embodiment of the present disclosure.
Figure 3B:
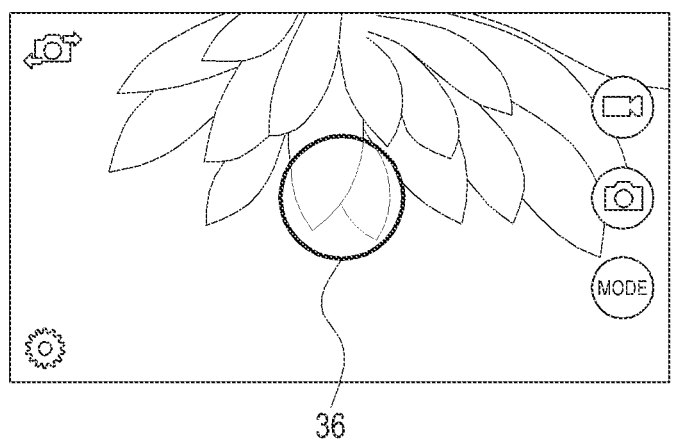

FIGS. 3A and 3B illustrate examples of a UI used in an electronic device according to an embodiment of the present disclosure. Hereinafter, examples of the UI provided by various embodiments of the present disclosure will be described with reference to FIGS. 3A and 3B.

Referring to FIGS. 3A and 3B, camera UIs 31, 32, and 33 may be overlaid with the preview image and may include a menu or a photographing button basically provided while the camera application is executed. For example, the camera UIs 31, 32, and 33 may include a mode selection menu 31 for selecting a photographing mode (e.g., a dynamic image photographing mode, an image photographing mode, a panorama photographing mode, and/or the like). Further, the camera UIs 31, 32, and 33 may include a camera selection menu 32 for selecting a camera to be used for the photographing from a plurality of cameras included in the electronic device. In addition, the camera UIs 31, 32, and 33 may include a camera setting menu 33 for receiving a camera setting value.

A UI 35a corresponding to a focus may display a visualized focus movement during a focus detecting operation. For example, the UI 35a corresponding to the focus may reflect a lens trace moving during the focus detecting operation by using focus data detected during the focus detecting operation. The UI 35a corresponding to the focus may display a movement direction of the focus to reflect a relation between successively provided pieces of focus data. For example, the UI 35a corresponding to the focus may be displayed while being rotated in a clockwise direction when a distance between the lens 1 and the image sensor unit 5 becomes shorter, and displayed while being rotated in a counterclockwise direction when the distance between the lens 1 and the image sensor unit 5 becomes longer.

According to various embodiments of the present disclosure, the UI 35a corresponding to the focus may display a rotation speed of the UI 35a corresponding to the focus as a fast speed when a distance difference between positions of the lens included in the pieces of the focus data is large, and display the rotation speed of the UI 35a corresponding to the focus as a slow speed when the distance difference between positions of the lens included in the pieces of the focus data is small. According to various embodiments of the present disclosure, the UI 35a corresponding to the focus may display a rotation angle of the UI 35a corresponding to the focus as a fast speed when a distance difference between positions of the lens included in the pieces of the focus data is large, and display the rotation angle of the UI 35a corresponding to the focus as a slow speed when the distance difference between positions of the lens included in the pieces of the focus data is small.

An AF completion display UI 36 may display that the auto focus detection is completed as illustrated in FIG. 3B. For example, the AF completion display UI 36 may include an indicator indicating an area at which the focus is detected and the indicator may inform of the focus detection by using a different color or a flicker effect.

Further, the UI 35a corresponding to the focus and the AF completion display UI 36 may be located at the area at which the focus is detected. For example, when the focus detection is made based on a designated area (e.g., center area), the UE 35a corresponding to the focus may be displayed on the designated area (e.g., center area) as illustrated in FIG. 3A, and the AF completion display UI 36 may be displayed on a designated area (e.g., center area) as illustrated in FIG. 3B. In another example, when the focus detection is made based on an area designated by a user input, the UI 35*a* corresponding to the focus may be displayed on the area designated by the user input.

According to various embodiments of the present disclosure, the camera controller 11 may further perform an operation of configuring a depth. For example, the camera controller 11 may provide an interface which can configure a depth of an image from the user. Further, the camera controller 11 may receive focus data in an image focus detecting process. Accordingly, the camera controller 11 may identify (e.g., determine) a focus value of the image data through the focus data and correct the image data by reflecting the depth configured by the user.

Hereinafter, the operation of configuring the depth of the camera controller 11 will be described through FIGS. 4A and 4B.

Figure 4A:
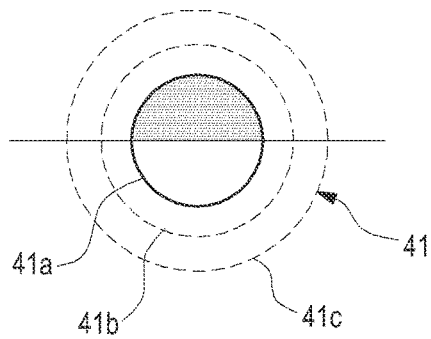
FIGS. 4A and 4B illustrate an example of a depth UI used in an electronic device according to an embodiment of the present disclosure.
Figure 4B:
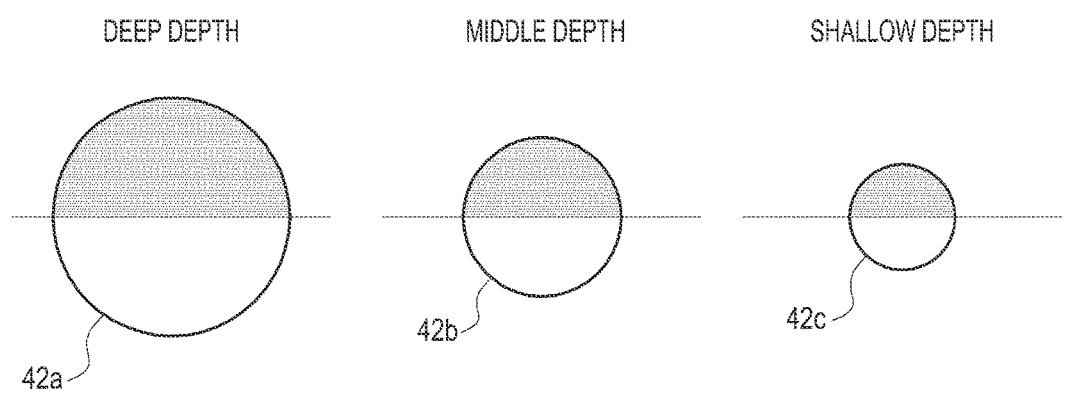

FIGS. 4A and 4B illustrate an example of a depth UI used in the electronic device according to various embodiments of the present disclosure.

Referring to FIGS. 4A and 4B, the camera application processor 12 may provide a signal instructing to provide a depth configuration UI 29-1 for configuring the depth to the UI processor 13 as the camera application operates. Accordingly, the UI processor 13 may display the depth configuration UI and configure a depth value by the user input 23. The user input 23 may include an input by a pinch to zoom gesture, an input by a single or multi touch drag gesture, or an input of a hardware button arranged on the electronic device.

The depth configuration UI 29-1 may include information making a request for configuring the depth by the user, for example, a depth configuration request message (e.g., "configure a depth") and an indicator 41 indicating the focus configuration. The indicator indicating the depth configuration of the focus may be made in the same shape as that of the UI 35*a* corresponding to the focus. A size of the indicator 41 indicating the depth configuration of the focus may be controlled by the user input and then the indicator having a controlled size 41*a*, 41*b*, or 41*c* may be displayed, and a size value of the depth may be configured according to the size 41*a*, 41*b*, or 41*c* of the indicator 41 controlled by the user input. For example, when the size of the indicator 41 is configured as a first size 42*a* as illustrated in FIG. 4B, the depth value may be configured as a first depth value. When the size of the indicator 41 is configured as a second size 42*b* as illustrated in FIG. 4B, the depth value may be configured as a second depth value. When the size of the indicator 41 is configured as a third size 42*c* as illustrated in FIG. 4C, the depth value may be configured as a third depth value. The first depth value may refer to a depth relatively shallower than the second depth value, and the second depth value may refer to a depth relatively shallower than the third depth value.

Figure 5A:
FIG. 5A illustrates an example of image data obtained by an electronic device according to an embodiment of the present disclosure.
Figure 5B:
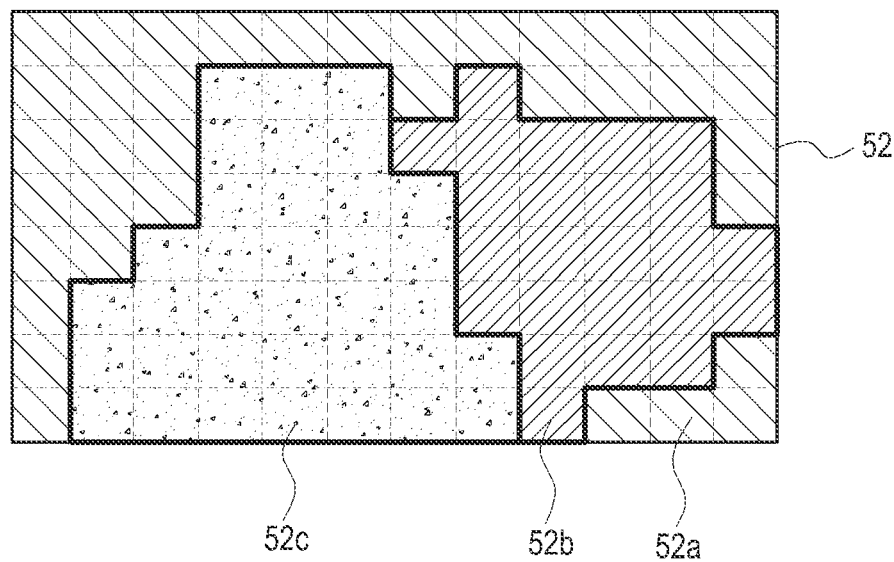
FIG. 5B illustrates an example of depth data analyzed from image data such as, for example, the image data of FIG. 5A according to an embodiment of the present disclosure.
Figure 5C:
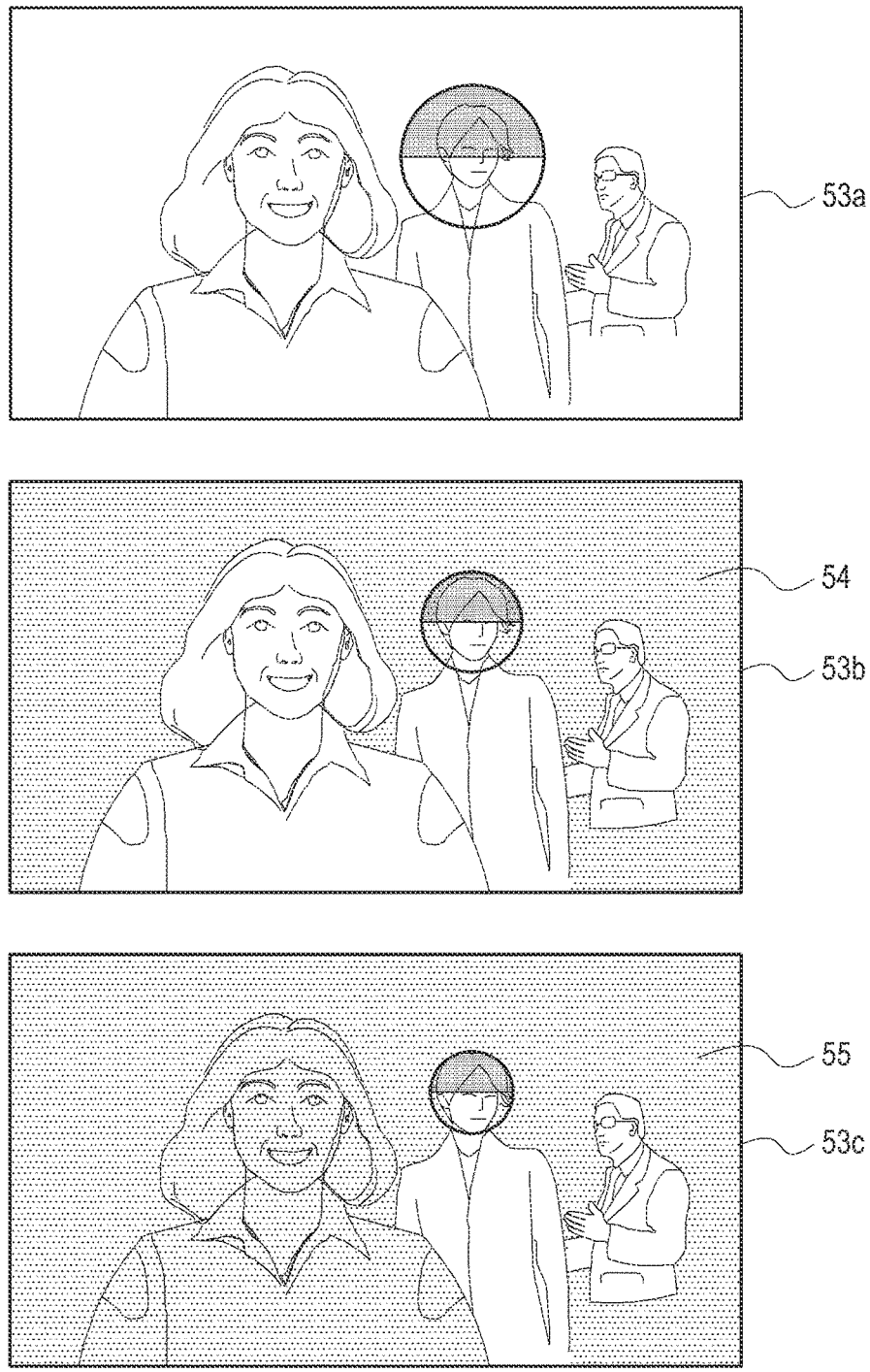
FIG. 5C illustrates an example of an image to which depth data is reflected by an electronic device according to an embodiment of the present disclosure.

FIG. 5A illustrates an example of image data obtained by an electronic device according to an embodiment of the present disclosure. FIG. 5B illustrates an example of depth data analyzed from image data such as, for example, the image data of FIG. 5A. FIG. 5C illustrates an example of an image to which depth data is reflected by an electronic device according to an embodiment of the present disclosure.

Referring to FIGS. 5A, 5B, and 5C, the UI processor 13 may provide a depth value determined by the user input to the camera application processor 12. Accordingly, the camera application processor 12 may perform a camera focus detection controlling operation by controlling the AF processor 15. The camera application processor 12 may receive focus data from the AF processor 15 while performing the camera focus detection controlling operation.

According to various embodiments of the present disclosure, as the camera focus detection controlling operation is completed and thus a focus of the image data is detected, the camera application processor 12 may identify (e.g., determine) and display the detected focus area. Further, the camera application processor 12 may identify (e.g., determine) distance information of a subject included in the image data by analyzing the focus data of the image data. For example, the camera application processor 12 may identify (e.g., determine) depth data 52 illustrated in FIG. 5B by analyzing focus data while detecting a focus of image data 51 illustrated in FIG. 5A. For example, the camera application processor 12 may identify (e.g., determine) depth layer information (e.g., a first layer 52*a*, a second layer 52*b*, and a third layer 52*c*) from which distance information of the subject included in the image data 51 is identified (e.g., determined). An operation of identifying (e.g., determining) the distance information of the subject or an operation of identifying (e.g., determining) the depth layer information may be performed equally to the operation of obtaining the focus information, the distance information of the subject, and the image depth map obtained in the initial process of the phase difference focus detecting operation.

As described above, the identified (e.g., determined) depth layer information may be reflected in the image data. For example, the identified (e.g., determined) depth layer information may be used for processing a correction of the image data to reflect the depth value configured by the user input. The processing of the correction of the image data to reflect the depth value configured by the user input may be performed according to an image processing operation 29-2. For example, when the depth value is configured as a first depth value by the user input, the camera application processor 12 may generate image data 53*a* by correcting the image data 51 illustrated in FIG. 5A in accordance with a depth of the first layer 52*a*. When the depth value is configured as a second depth value by the user input, the camera application processor 12 may generate image data 53*b* (e.g., an image comprising image data 53*b*) by correcting the image data 51 in accordance with a depth of the second layer 52*b*. For example, the camera application processor 12 may process a blur effect for the remaining areas except for the second layer 52*b*. When the depth value is configured as a third depth value by the user input, the camera application processor 12 may generate image data 53*c* (e.g., an image 55 comprising image data 53*c*) by correcting the image data 51 in accordance with a depth of the third layer 52*c*. For example, the camera application processor 12 may process a blur effect for the remaining areas except for the third layer 52*c*. According to various embodiments of the present disclosure, a size of the aperture (not shown) located at a position corresponding to the lens 1 of the electronic device may be controlled to reflect the identified (e.g., determined) depth layer information in the image data.

Figure 6:
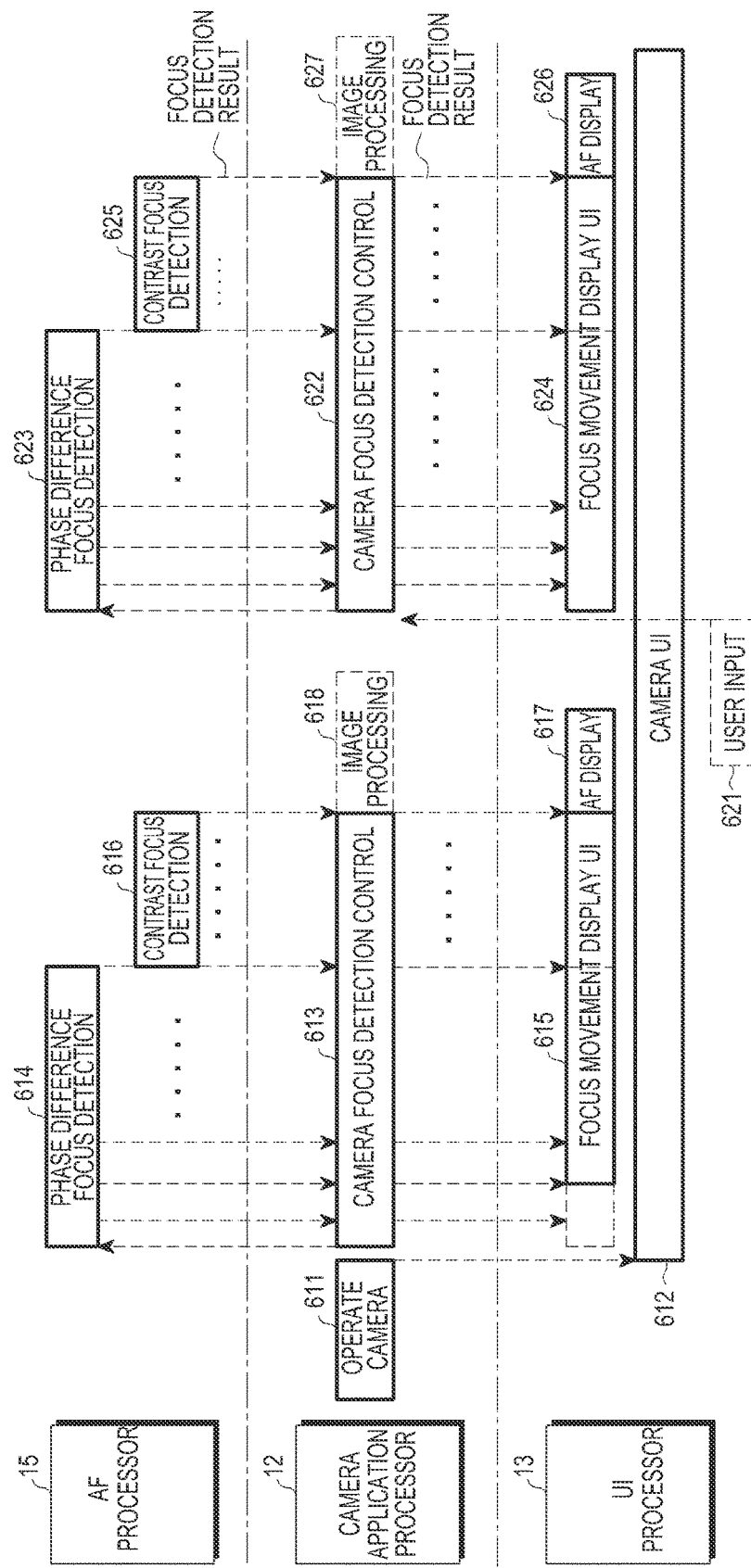
FIG. 6 illustrates an operation of a controller included in an electronic device according to an embodiment of the present disclosure.

FIG. 6 illustrates an operation of the controller included in the electronic device according to an embodiment of the present disclosure.

Referring to FIG. 6, operations of the camera application processor 12, the UI processor 13, and the AF processor 15 included in the controller 10 may be illustrated.

At operation 611, the camera application processor 12 initiates a camera application operation. For example, as a request for the camera application operation is made, the camera application processor 12 may initiate operations of the image sensor unit 5 and the A/D converter 6 to output image data (e.g., preview image data) provided through the image sensor unit 5 and the A/D converter 6 through the display unit 7. Further, at operation 612, the camera application processor 12 may instruct the UI processor 13 to provide a camera UI. Accordingly, the UI processor 13 may generate the camera UI including a menu or a photographing button basically provided while the camera application is executed and provide the generated camera UI to the display unit 7. Thereafter, the display unit 7 may display the camera UI 31, 32, or 33 (see FIG. 3A) together with the preview image data.

At operation 613, the camera application processor 12 may perform a camera focus detection controlling operation. For example, the camera application processor 12 may transmit a control signal for instructing a camera focus detection to the AF processor 15. Accordingly, the AF processor 15 performs the focus detection by a phase difference focus detection scheme. For example, at operation 614, the AF processor 15 performs the focus detection using the phase difference focus detection scheme. For example, the AF processor 15 may control to operate the plurality of phase difference sensors 5a to 5u based on the initial lens positions in the initial process of initiating the image photographing of the electronic device and identify (e.g., determine) a plurality of pieces of phase data provided from the plurality of phase difference sensors 5a to 5u. According to various embodiments of the present disclosure, the AF processor 15 may identify (e.g., determine) focus information (e.g., difference between phases of the phase difference sensors) on a subject corresponding to areas at which the plurality of phase difference sensors 5a to 5u are located and configure an image depth map using the focus information on the subject. For example, the AF processor 15 may obtain a relative distance between subjects based on the difference between the phases of the plurality of phase difference sensors 5a to 5u and configure the image depth map based on the obtained relative distance. The AF processor 15 may estimate a first lens position corresponding to a designated area (e.g., image center area, area designated by a user input, and/or the like) based on a plurality of pieces of phase data and distance information on the subject. Further, the AF processor 15 may identify (e.g., determine) a relation between the initial lens position and the estimated first lens position and determine a movement direction, a movement distance, a movement speed, and/or the like of the lens from the initial lens position to the estimated first lens position. In addition, the AF processor 15 may move the lens 1 to the estimated first lens position to reflect the movement direction, movement distance, and movement speed of the lens by controlling the lens driver 3 and the lens position detector 4. Through such operations, the AF processor 15 may complete the phase difference detecting operation. According to various embodiments of the present disclosure, the camera application processor 12 may receive the focus information or the lens movement information (e.g., lens movement direction, lens movement distance, lens movement speed, and/or the like) from the AF processor 15 in the camera focus detection controlling operation, for example, in the focus detecting operation of the AF processor 15. In response to the reception of the information, the camera application processor 12 may instruct the UI processor 13 to provide a UI corresponding to the focus using the focus information or the lens movement information. At operation 615, the UI processor 13 generates or controls the UI corresponding to a focus using the focus information or the lens movement information and displays the UI on the display unit 7.

According to various embodiments of the present disclosure, the UI processor 13 may display the UI corresponding to the focus to reflect information related to the focus detection (e.g., lens trace) by using the focus information or the lens movement information detected in an operation of performing the focus detecting operation. For example, the UI processor 13 may display the UI corresponding to the focus based on at least one of an initial lens position, a plurality of pieces of focus information provided from the plurality of phase difference sensors 5a to 5u, distance information on a subject, an image depth map, and a position relation (e.g., direction, distance, and/or the like) between the initial lens position and a first lens position (e.g., a lens position estimated for a preset area (e.g., center area, an area designated by a user input, and/or the like). For example, the UI processor 13 may provide the UI corresponding to the UI focus corresponding to the focus to reflect a movement direction of the lens moving from the initial lens position to the first lens position and a distance from the initial lens position to the first lens position. According to various embodiments of the present disclosure, the UI processor 13 may differently display the UI corresponding to the focus according to a movement direction of the lens. For example, when the lens moves in a first direction (e.g., a direction in which the image sensor is located), the UI processor 13 may display such that the UI corresponding to the UI focus corresponding to the focus rotates in a clockwise direction (or counterclockwise direction). When the lens moves in a second direction (e.g., a direction in which the subject is located such as, for example, a direction opposite to the direction in which the image sensor is located), the UI processor 13 may display such that the UI corresponding to the focus rotates in a counterclockwise direction (or clockwise direction). Further, the UI processor 13 may configure and display a rotation speed or a rotation angle of the UI corresponding to the focus in proportion to a size of the distance between the initial lens position and the first lens position.

According to various embodiments of the present disclosure, after the initial process of initiating the image photographing process is completed, the AF processor 15 may identify (e.g., determine) the focus information (e.g., phase difference value) while changing a position of the lens and provide the position of the lens (or a lens movement direction, a lens movement distance, and/or the like) moving in the unit of phase difference focus detection distances and the focus information (e.g., phase difference value) to the camera application processor 12. Accordingly, the UI processor 13 may display a rotation direction, a rotation speed or a rotation angle of the UI corresponding to the focus to reflect the position of the lens (or the lens movement direction, the lens movement distance or the like) moving in the unit of phase difference focus detection distances and the focus information (e.g., phase difference value) provided from the camera application processor 12.

After the phase difference focus detecting operation is completed, at operation 616, the AF processor 15 may further perform the focus detecting operation by applying a contrast detection scheme based on the phase difference focus lens position identified (e.g., determined) in the phase difference focus detecting operation. For example, the AF processor 15 may identify (e.g., determine) image data input through the image sensor unit 5 and the A/D converter 6 while moving the lens 1 in the unit of predetermined distances (e.g., a distance having a size relatively smaller than the phase difference focus detection distance, hereinafter referred to as a "contrast focus detection distance) within a range corresponding to the phase difference focus lens position by controlling the lens driver 3 and the lens position detector 4 and identify (e.g., determine) focus information of the image data. The image data may include an image value of a pixel corresponding to the preset area (e.g., a center area, an area designated by the user input, and/or the like). The AF processor 15 may detect a contrast value between pixels corresponding to the preset area (e.g., a center area, an area designated by the user input, and/or the like) as the focus information and determine a focus value of the image data by using the detected focus information (e.g., contrast value between the pixels). At this time, the AF processor 15 may configure an area in which the detected contrast value becomes a maximum value as a final focus area. The AF processor 15 moves a position of the lens 1 to a position (hereinafter referred to as a "contrast focus lens position") corresponding to the final focus area by controlling the lens driver 3 and the lens position detector 4 according to the configuration of the final focus area. The AF processor 15 may provide information indicating that the final focus area has been configured to the camera application processor 12.

According to various embodiments of the present disclosure, after the phase difference focus detecting operation is completed, at operation 616, the AF processor 15 can perform a contrast focus detecting operation. The focus information or lens movement information identified (e.g., determined) during the phase difference focus detecting operation and the focus information or lens movement information identified (e.g., determined) during the contrast focus detecting operation may be provided to the camera application processor 12. The camera application processor 12 may control a UI provided by the UI processor 13 in consideration of a time from a time point when the focus information or the lens movement information by the phase difference focus detecting operation is received to a time point when the focus information or the lens movement information by the contrast focus detecting operation is received. For example, when the time from the time point when the focus information or the lens movement information by the phase difference focus detecting operation is received to the time point when the focus information or the lens movement information by the contrast focus detecting operation is received exceeds a predetermined threshold, the camera application processor 12 may provide a signal instructing, maintaining, and providing the UI corresponding to the currently displayed focus to the UI processor 13. In contrast, when the time from the time point when the focus information or the lens movement information by the phase difference focus detecting operation is received to the time point when the focus information or the lens movement information by the contrast focus detecting operation is received does not exceed the predetermined threshold, the camera application processor 12 may provide a signal instructing to reflect the focus information or the lens movement information while providing the focus data by the contrast focus detecting operation to the UI processor 13. Accordingly, the UI processor 13 may display the UI corresponding to the currently displayed UI corresponding to the focus to reflect the focus data by the contrast focus detecting operation.

In the focus detecting operation according to various embodiments of the present disclosure, for the displaying of the UI reflecting a lens trace moving in the focus detecting operation, at least two pieces of focus data used for identifying (e.g., determining) the lens trace may be required. Accordingly, after the two or more pieces of focus data are input from the AF processor 15, the UI processor 13 may provide the UI corresponding to the focus, reflecting a position of the lens included in the two or more pieces of focus data, to the display unit 7. Further, in another example, as a camera focus detection control is performed by the camera application processor 12, the UI processor 13 may provide the UI corresponding to the focus to the display unit 7, but fixedly display the UI corresponding to the focus without reflecting the lens trace. Thereafter, the UI processor 13 may display the UI corresponding to the focus to which the lens movement trace is reflected after two or more pieces of focus data are input from the AF processor 15. According to various embodiments of the present disclosure, the UI processor 13 may additionally or alternatively receive information on the lens trace from the AF processor 15. For example, the UI processor 13 may receive information on a movement direction and a movement distance of the lens from the AF processor 15.

According to various embodiments of the present disclosure, the camera application processor 12 may receive information indicating that a final focus area is configured from the AF processor 15 and instruct the UI processor 13 to provide an AF display UI displaying the AF detection. Accordingly, at operation 617, the UI processor 13 generates the AF display UI 36 displaying the AF detection and displays the generated AF display UI on the display unit 7.

Further, at operation 618, the camera application processor 12 identifies (e.g., determines), from the AF processor 15, that a first final focus area is configured, and may process an operation of correcting the image data by reflecting a predetermined depth value (or depth value configured by the user). For example, the camera application processor 12 may perform the operation of correcting the image data reflecting the depth value by using the distance information of the subject or the image depth map configured based on the plurality of pieces of phase data obtained from the plurality of phase difference sensors 5a to 5u in the initial process of initiating the image photographing operation of the electronic device.

Thereafter, at operation 621, a user input for making a request for changing the focus area through the use input 8 is generated. As a user input making a request for changing the focus area through the user input unit 8 is generated, for example, as the user selects one area of the displayed image data, the UI processor 13 may identify (e.g., determine) a coordinate of the area and provide the identified (e.g., determined) coordinate to the camera application processor 12. Then, at operation 622, the camera application processor 12 may re-execute the camera focus detection controlling operation. According to various embodiments of the present disclosure, the camera application processor 12 may control the re-execution of the camera focus detection controlling operation as the area photographed through the image sensor unit 5 is changed. For example, the camera application processor 12 may provide a control signal for instructing the camera focus detection to the AF processor 15.

The camera application processor 12 may store focus data previously obtained while performing focus detections 613, 614, and 616, particularly, information finally obtained while performing the phase difference focus detection 614. Further, the camera application processor 12 may provide the focus data obtained while performing the focus detections 613, 614, and 616 of the previously designated area (e.g., center area) to the AF processor 15. Alternatively, the AF processor 15 may store the focus information obtained while previously performing the focus detections 613, 614, and 616, particularly, the focus information (phase difference value) finally obtained while performing the phase difference focus detection 614.

Thereafter, at operation 623, the AF processor 15 may perform the focus detection based on the focus detection finally obtained while performing the phase difference focus detection. For example, the AF processor 15 may identify (e.g., determine) information finally obtained while preferentially performing the phase difference focus detection, for example, focus information (e.g., phase difference value) corresponding to the phase difference focus lens position, distance information of the subject calculated from the focus information (e.g., phase difference value), or image depth map information. The AF processor 15 may estimate a second lens position corresponding to an area designated by the user input based on the focus information (e.g., phase difference value), the distance information of the subject calculated from the focus information (e.g., phase difference value), or the image depth map information. Further, the AF processor 15 may identify (e.g., determine) a relation between the phase difference focus lens position and the estimated second lens position and determine a movement direction and a movement distance of the lens from the phase difference focus lens position to the estimated second lens position. In addition, the AF processor 15 may move the lens 1 to the estimated second lens position by controlling the lens driver 3 and the lens position detector 4. Through such operations, the AF processor 15 may complete the phase difference detecting operation.

According to various embodiments of the present disclosure, after moving the lens 1 to the estimated first lens position, the AF processor 15 may further perform the phase difference detecting operation. The AF processor 15 may identify (e.g., determine) focus information based on the first lens position by controlling the lens driver 3 and the lens position detector 4. For example, the AF processor 15 may move the lens 1 in the unit of predetermined distances (e.g., phase difference focus detection distances) based on the first lens position as a reference point. In the operation, the AF processor 15 may identify (e.g., determine) focus information provided by (at least one of) the plurality of phase difference sensors 5a to 5u at every position at which the lens 1 moves. The AF processor 15 may identify (e.g., determine) focus information at a changed lens position to determine a focused position (e.g., a lens position indicating phase data of a largest value, for example, a phase difference focus lens position) of the designated area (e.g., an image center area, an area designated by the user input, and/or the like) and control the lens to be located at the corresponding position. Through such an operation, even though the focus area is re-configured by the user input or the movement of the electronic device, the focus area can be rapidly detected again.

According to various embodiments of the present disclosure, the camera application processor 12 may receive the focus information or the lens movement information (e.g., lens movement direction, lens movement distance, and lens movement speed) from the AF processor 15 in the camera focus detection controlling operation, for example, in the focus detecting operation of the AF processor 15. In response to the reception of the information, the camera application processor 12 may instruct the UI processor 13 to provide a UI corresponding to the focus using the focus information or the lens movement information. At operation 624, the UI processor 13 generates or controls the UI corresponding to the focus using the focus information or the lens movement information and displays the UI on the display unit 7.

According to various embodiments of the present disclosure, the UI processor 13 may display the UI corresponding to the focus to reflect information related to the focus detection (e.g., lens trace) by using the focus information or the lens movement information detected in an operation of performing the focus detecting operation. For example, the UI processor 13 may display the UI corresponding to the focus based on at least one of an initial lens position, a plurality of pieces of focus information provided from the plurality of phase difference sensors 5a to 5u, distance information on a subject, an image depth map, and a position relation (e.g., direction, distance, and/or the like) between the initial lens position and a first lens position (e.g., a lens position estimated for a preset area (e.g., a center area, an area designated by a user input, and/or the like). For example, the UI processor 13 may provide the UI corresponding to the UI focus corresponding to the focus to reflect a movement direction of the lens moving from the initial lens position to the first lens position and a distance from the initial lens position to the first lens position. According to various embodiments of the present disclosure, the UI processor 13 may differently display the UI corresponding to the focus according to a movement direction of the lens. For example, when the lens moves in a first direction (e.g., a direction in which the image sensor is located), the UI processor 13 may display such that the UI corresponding to the UI focus corresponding to the focus rotates in a clockwise direction (or counterclockwise direction). When the lens moves in a second direction (e.g., a direction in which the subject is located such as, for example, a direction opposite to the direction in which the image sensor is located), the UI processor 13 may display such that the UI corresponding to the focus rotates in a counterclockwise direction (or clockwise direction). Further, the UI processor 13 may configure and display a rotation speed or a rotation angle of the UI corresponding to the focus in proportion to a size of the distance between the initial lens position and the first lens position.

According to various embodiments of the present disclosure, after the initial process of initiating the image photographing process is completed, the AF processor 15 may identify (e.g., determine) the focus information (e.g., phase difference value) while changing a position of the lens and provide the position of the lens (or a lens movement direction, a lens movement distance, and/or the like) moving in the unit of phase difference focus detection distances and the focus information (e.g., phase difference value) to the camera application processor 12. Accordingly, the UI processor 13 may display a rotation direction, a rotation speed or a rotation angle of the UI corresponding to the focus to reflect the position of the lens (or the lens movement direction, the lens movement distance or the like) moving in the unit of phase difference focus detection distances and the focus information (e.g., phase difference value) provided from the camera application processor 12.

According to various embodiments of the present disclosure, at operation 625, the AF processor 15 may further perform the focus detecting operation by applying a contrast detection scheme based on the phase difference focus lens position identified (e.g., determined) in the phase difference focus detecting operation after the phase difference focus detecting operation is completed. For example, the AF processor 15 may identify (e.g., determine) image data input through the image sensor unit 5 and the A/D converter 6 while moving the lens 1 in the unit of predetermined distances (e.g., distance having a size relatively smaller than the phase difference focus detection distance, hereinafter referred to as a "contrast focus detection distance") within a range corresponding to the phase difference focus lens position by controlling the lens driver 3 and the lens position detector 4 and identify (e.g., determine) focus information of the image data. The image data may include an image value of a pixel corresponding to the preset area (e.g., a center area, an area designated by the user input, and/or the like). The AF processor 15 may detect a contrast value between pixels corresponding to the preset area (e.g., a center area, an area designated by the user input, and/or the like) as the focus information and determine a focus value of the image data by using the detected focus information (e.g., contrast value between the pixels). At this time, the AF processor 15 may configure an area in which the detected contrast value becomes a maximum value as a final focus area. The AF processor 15 moves a position of the lens 1 to a contrast focus lens position by controlling the lens driver 3 and the lens position detector 4 according to the configuration of the final focus area. The AF processor 15 may provide information indicating that the final focus area has been configured to the camera application processor 12. Accordingly, the camera application processor 12 may instruct the UI processor 13 to provide an AF display UI displaying the AF detection. Accordingly, at operation 626, the UI processor 13 generates the AF display UI 36 displaying the AF detection and displays the generated AF display UI on the display unit 7.

Further, at operation 627, the camera application processor 12 identifies (e.g., determines), from the AF processor 15, that a second final focus area is configured, and may further process an operation of correcting the image data by reflecting a predetermined depth value (or depth value configured by the user).

The focus detecting operation has been described through the above embodiment of the present disclosure. Particularly, although it has been described that the phase difference detection scheme and the contrast detection scheme are sequentially performed for a more rapid and accurate focus detecting operation, the present disclosure does not limit the focus detection scheme. The various embodiments of the present disclosure are sufficient if the focus data identified (e.g., determined) while the focus is detected is provided to the camera application processor 12. According to various embodiments of the present disclosure, at least one of the phase difference detection scheme and the contrast detection scheme may be adapted or various schemes performing the focus detection may be used by those skilled in the art.

Figure 7:
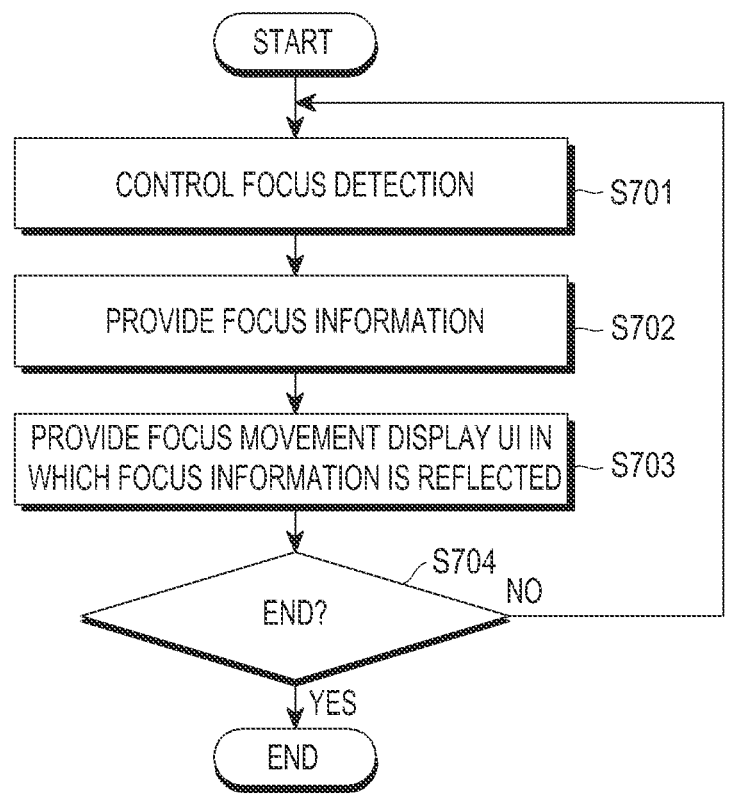
FIG. 7 is a flowchart illustrating an order of an image focus displaying method according to an embodiment of the present disclosure.

FIG. 7 is a flowchart illustrating an order of an image focus displaying method according to an embodiment of the present disclosure.

Referring to FIG. 7, the image focus displaying method according to the embodiment may include operation S701 of controlling a focus detection. Operation S701 may be performed as an auto focus detecting operation is initiated. At operation S701, the electronic device (e.g., controller 10) may detect a focus by using at least one of focus information (e.g., phase difference value) provided from a plurality of phase difference sensors included in the electronic device and focus information (e.g., contrast value of image data) provided from an image sensor included in the electronic device. Further, at operation S701, the electronic device may perform the focus detection by detecting focus information (e.g., phase difference value or contrast value of the image data) of each lens position while moving the position of the lens included in the electronic device. At operation S701, the electronic device may repeatedly move the lens position until the focus detection of a designated area (e.g., center area) (or area designated by a user input) is completed and may detect the focus information (e.g., phase difference value, or contrast value of the image data).

At operation S702, the electronic device may provide the focus information (e.g., phase difference value or contrast value of the image data) obtained in the auto focus detecting operation of the designated area (e.g., an image center area, an, area designated by the user input, and/or the like). Particularly, the focus information (e.g., phase difference value or contrast value of the image data) obtained in an auto focus configuration operation may be provided to a component processing a camera application UI.

At operation S703, the electronic device may generate and display the UI (e.g., UI 35a illustrated in FIG. 3A) corresponding to the focus displaying a movement of the lens by using the focus information (e.g., phase difference value or contrast value of the image data) obtained in the auto focus configuration operation.

Operations S701 to S703 may be repeatedly performed until the focus detection is completed (S704—No). For example, at operation S704, the electronic device may determine whether the focus detection is complete. If the electronic device determines that the focus detection is not complete at operation S704, then the electronic device may proceed to operation S701. In contrast, if the electronic device determines that the focus detection is complete at operation S704, then the electronic device may end the focus detection process.

Figure 8:
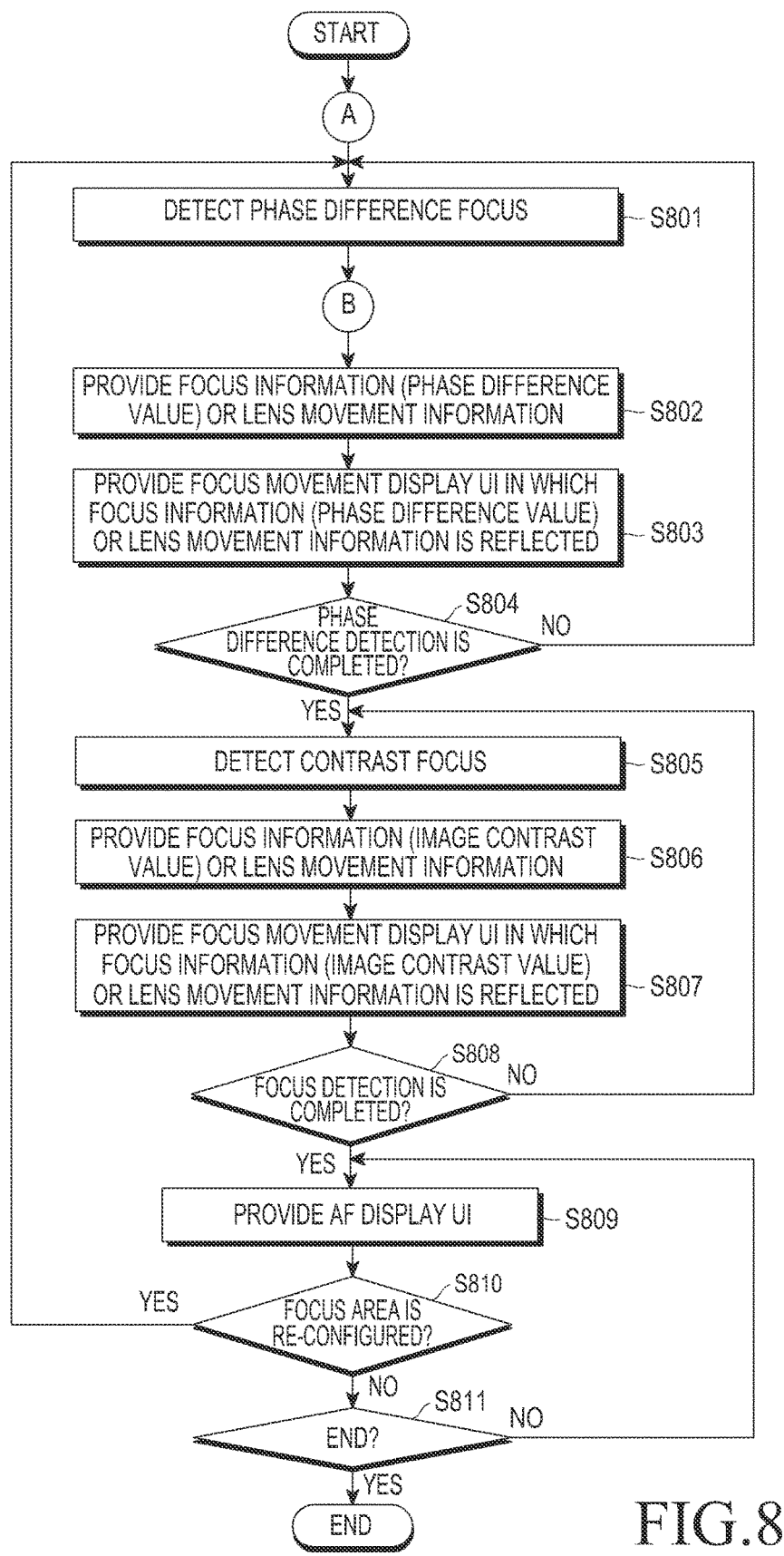
FIG. 8 is a flowchart illustrating an order of an image focus displaying method according to an embodiment of the present disclosure.

FIG. 8 is a flowchart illustrating an order of an image focus displaying method according to an embodiment of the present disclosure.

Referring to FIG. 8, the image focus displaying method according to another embodiment of the present disclosure may include an operation 801 of detecting a phase difference focus. For example, at operation S801, the electronic device may detect a phase difference focus. Operation S801 may be performed as an auto focus detecting operation is initiated.

At operation S801, the electronic device (e.g., controller 10) may receive a plurality of pieces of focus information (e.g., phase difference value) provided from a plurality of phase difference sensors by controlling operations of the plurality of phase difference sensors included in the electronic device. The electronic device may identify (e.g., determine) focus information (e.g., difference between phases of the phase difference sensors) of subjects corresponding to areas at which the plurality of phase difference sensors are located, by using the plurality of pieces of focus information (e.g., phase difference value). Further, at operation S801, the electronic device may configure an image depth map using the focus information of the subject. For example, a relative distance between subjects may be obtained based on the difference between the phases of the plurality of phase difference sensors, and the image depth map may configured based on the relative distance. Thereafter, based on a plurality of pieces of phase data and distance information on the subject, a lens position corresponding to a designated area (e.g., an image center area, an area designated by a user input, and/or the like) may be estimated.

According to various embodiments of the present disclosure, the electronic device may determine a relation between the initial lens position and the estimated first lens position and determine lens movement information including at least one of a movement direction, a movement distance, and a movement speed of the lens from the initial lens position to the estimated first lens position.

At operation S802, the electronic device may provide the focus information or lens movement information detected while performing a phase difference focus detection controlling operation. The focus information or the lens movement information may be provided to a component processing the camera application UI.

For example, the electronic device (e.g., component processing the camera application UI) may generate and display the UI corresponding to the focus by using the focus information or the lens movement information.

At operation S803, the electronic device may provide a focus movement display UI in which focus information (e.g., a phase difference value) or lens movement information is reflected.

Operations S802 and S803 may be performed in parallel to operation S801 or may be repeatedly performed until the phase difference focus detecting operation is completed at operation S804. For example, at operation S704, the electronic device may determine whether the phase difference detection is complete. If the electronic device determines that the phase difference detection is not complete at operation S804, then the electronic device may proceed to operation S801. In contrast, if the electronic device determines that the phase difference detection is complete at operation S804, then the electronic device may proceed to operation S805.

When the phase difference focus detecting operation is completed, operation S809 of displaying a completion of the focus detection may be performed.

In another example, in order to guarantee the reliability of the auto focus detected through the phase difference focus detecting operation, an operation of identifying (e.g., determining) whether the auto focus detected through the phase difference focus detecting operation is accurately achieved may be further performed. The operation of identifying (e.g., determining) whether the auto focus detected through the phase difference focus detecting operation is accurately achieved may be performed by focus detecting operations S805 to S808 by the contrast detection scheme.

At operation S805, the electronic device may detect a contrast focus. For example, at operation S805, the electronic device may further perform a focus detecting operation by applying the contrast detection scheme based on the focus lens position identified (e.g., determined) in the phase difference focus detecting operation. For example, the electronic device may identify (e.g., determine) image data while moving the lens in the unit of predetermined distances (distance relatively smaller than the phase difference focus detection distance, hereinafter referred to as a "contrast focus detection distance") within a range corresponding to the phase difference focus lens position and also identify (e.g., determine) focus information of the image data. The image data may include an image value of a pixel corresponding to the preset area (e.g., a center area, an area designated by the user input, and/or the like). A contrast value between pixels corresponding to the preset area (e.g., an center area, an area designated by the user input, and/or the like) may be detected as the focus information and a focus value of the image data may be determined by using the detected focus information (contrast value between the pixels). At this time, an area in which the detected contrast value becomes a maximum value may be configured as a final focus area. As the final focus area is configured, the lens may be moved to a position corresponding to the final focus area (hereinafter referred to as a "contrast focus lens position").

At operation S806, the electronic device may provide the focus information or the lens movement information identified (e.g., determined) while performing the contrast focus detecting operation to a component processing the camera application UI.

For example, the component processing the camera application UI may generate and display the UI corresponding to the focus by using the focus information or the lens movement information while performing the contrast focus detecting operation.

At operation S807, the electronic device may provide a focus movement display UI in which focus information (e.g., an image contrast value) or lens movement information is reflected. For example, at operation S807, the electronic device may control the UI in consideration of a time from a time point when the focus information or the lens movement information by the phase difference focus detecting operation is received to a time point when the focus information or the lens movement information by the contrast focus detecting operation is received. For example, when the time from the time point when the focus information or the lens movement information by the phase difference focus detecting operation is received to the time point when the focus information or the lens movement information by the contrast focus detecting operation is received exceeds a predetermined threshold, the electronic device may maintain and provide the currently displayed UI corresponding to the focus. In contrast, when the time from the time point when the focus information or the lens movement information by the phase difference focus detecting operation is received to the time point when the focus information or the lens movement information by the contrast focus detecting operation is received does not exceed the predetermined threshold, the electronic device may reflect the focus information or the lens movement information to the UI corresponding to the focus and display the UI.

Operations S805 to S807 may be repeatedly performed until the contrast focus detection is completed. After the contrast focus detection is completed (S808—Yes), operation S809 may be performed. For example, at operation S808, the electronic device may determine whether the focus detection is complete. If the electronic device determines that the focus detection is not complete at operation S808, then the electronic device may proceed to operation S805. In contrast, if the electronic device determines that the focus detection is complete at operation S808, then the electronic device may proceed to operation S809.

At operation S809, the electronic device may identify (e.g., determine) that a final focus area is configured, and generate and display an AF display UI displaying the AF detection.

The focus detecting operation by the contrast detection scheme may be used to identify (e.g., determine) whether the focus identified (e.g., determined) through the phase difference focus detecting operation is accurately detected. Accordingly, the electronic device may determine that the focus detection of the final focus area fails when a contrast value of the final focus area is relatively smaller than a predetermined threshold and determine that the focus detection of the final focus area is successful when the contrast value of the final focus area is equal to or relatively larger than the predetermined threshold. At operation S809, the electronic device may display the AF display UI by using information indicating the success or failure of the focus detection of the final focus area. For example, when the focus detection of the final focus area is successful or fails, the AF display UI may be displayed with difference colors (e.g., success-green and failure-red).

Thereafter, when the focus area is re-configured, for example, when an area of which a focus will be detected by a user input is changed or (a subject included within) image data input through the image sensor is changed, operations S801 to S809 are re-executed and thus the AF focus may be detected again at S810. For example, at operation S810, the electronic device determines whether the focus area is reconfigured. If the electronic device determines that the focus area is reconfigured at operation S810, then the electronic device may return to operation S810. In contrast, if the electronic device determines that the focus area is reconfigured at operation S810, then the electronic device may proceed to operation S811.

Further, operations S809 and S810 may be repeatedly performed until the AF focus detecting operation ends. At operation S811, the electronic device may determine whether AF focus detecting operation ends. If the electronic device determines that the AF focus detecting operation does not end at operation S811, then the electronic device may return to operation S809. In contrast, if the electronic device determines that the AF focus detecting operation ends at operation S811, then the electronic device terminate the image focus displaying method.

According to various embodiments of the present disclosure, an image focus providing method may further include an operation of configuring a size of a depth (not shown). For example, an environment (e.g., a depth configuration UI) in which the user can configure a depth of an image may be provided and a depth value may be configured by a user input. The user input may include an input by a pinch to zoom gesture, an input by a single or multi touch drag gesture, or an input of a hardware button arranged on the electronic device.

The depth configuration UI may include information making a request for configuring the depth by the user, for example, a depth configuration request message (e.g., "configure a depth") and the indicator 41 illustrated in FIG. 4 indicating the focus configuration. The indicator 41 indicating the depth configuration of the focus may be made in the same shape as that of the UI corresponding to the focus. A size of the indicator 41 indicating the depth configuration of the focus may be controlled by the user input and then the indicator having a controlled size 41a, 41b, or 41c may be displayed, and a size value of the depth may be configured according to the size 41a, 41b, or 41c of the indicator 41 controlled by the user input. For example, when the size of the indicator 41 is configured as a first size 42a as illustrated in FIG. 4A, the depth value may be configured as a first depth value. When the size of the indicator 41 is configured as a second size 42b as illustrated in FIG. 4B, the depth value may be configured as a second depth value. When the size of the indicator 41 is configured as a third size 42c as illustrated in FIG. 4C, the depth value may be configured as a third depth value. The first depth value may refer to a depth relatively shallower than the second depth value, and the second depth value may refer to a depth relatively shallower than the third depth value.

According to various embodiments of the present disclosure, the image focus providing method may identify (e.g., determine) a depth layer by using focus data provided in an operation of detecting a focus of the image data and perform post-processing of the image data by reflecting the identified (e.g., determined) depth layer information and a size of a depth input by the user in the above described operation. For example, as the camera focus detection controlling operation is completed and thus the focus of the image data is detected, focus data of the image data is analyzed, and accordingly, a distance relation between subjects included in the image data can be identified (e.g., determined). For example, the depth data 52 illustrated in FIG. 5B may be identified (e.g., determined) by analyzing focus data identified (e.g., determined) while detecting a focus of image data 51 illustrated in FIG. 5A. For example, the depth layer information (e.g., the first layer 52a, the second layer 52b, and the third layer 52c) from which the distance information of the subjects included in the image data 51 is identified (e.g., determined) may be identified (e.g., determined). The identified (e.g., determined) depth layer information may be used for the post-processing of correcting the image data to reflect the depth value configured by the user input. For example, when the depth value is configured as the first depth value by the user input, the image data 53a may be generated by correcting the image data 51 as illustrated in FIG. 5A in accordance with the depth of the first layer 52a.

For example, when the depth value is configured as the second depth value by the user input, a blur effect may be processed on the image data 53b corrected from the image data 51 in accordance with the depth of the second layer 52b, for example, the remaining areas except for the second layer 52b as indicated by a reference numeral 54. When the depth value is configured as the second depth value by the user input, a blur effect may be processed on the image data 53c corrected from the image data 51 in accordance with the depth of the third layer 52c, for example, the remaining areas except for the third layer 52c as indicated by a reference numeral 55. According to various embodiments of the present disclosure, a size of the aperture (not shown) located at a position corresponding to the lens 1 of the electronic device may be controlled to reflect the identified (e.g., determined) depth layer information in the image data.

The method according to various embodiments of the present disclosure corresponding to the image data processing method by the electronic device may include an operation of obtaining focus information of the image data, an operation of identifying (e.g., determining) lens movement information for focusing the camera on a focus area of the image data based on the focus information, and an operation of displaying a UI corresponding to the lens movement information on a display of the electronic device.

The operation of obtaining the focus information may include an operation of obtaining the focus information by using at least one phase difference focus sensor.

The lens movement information may include at least one of a movement distance of the lens, a movement direction of the lens, and a movement speed of the lens.

The displaying operation may include an operation of displaying a difference rotation direction of the UI according to the lens movement direction.

The operation of displaying the difference rotation direction may include an operation of rotating the UI in a clockwise direction when the lens movement direction is a first direction and rotating the UI in a counterclockwise direction when the lens movement direction is a second direction.

The displaying operation may include an operation of determining and displaying a rotation amount of the image according to the lens movement distance.

The displaying operation may include an operation of determining and displaying a rotation speed of the image according to the lens movement speed.

The method according to various embodiments of the present disclosure may include an operation of identifying (e.g., determining) a depth of field of at least one subject and an operation of determining and displaying a size of the UI according to the depth of field.

The operation of identifying (e.g., determining) the depth of field may include an operation of determining the depth by using at least one of focus information, aperture information, and distance information of at least one subject included in the image data.

The method according to various embodiments of the present disclosure may include an operation of identifying (e.g., determining) a user input and an operation of controlling a depth of field of the image data based on the user input.

The operation of controlling the depth of field may include an operation of controlling a size of the aperture functionally connected to the lens.

The operation of controlling the depth of field may include an operation of applying a blur image effect to at least one subject included in the image data.

Figure 9:
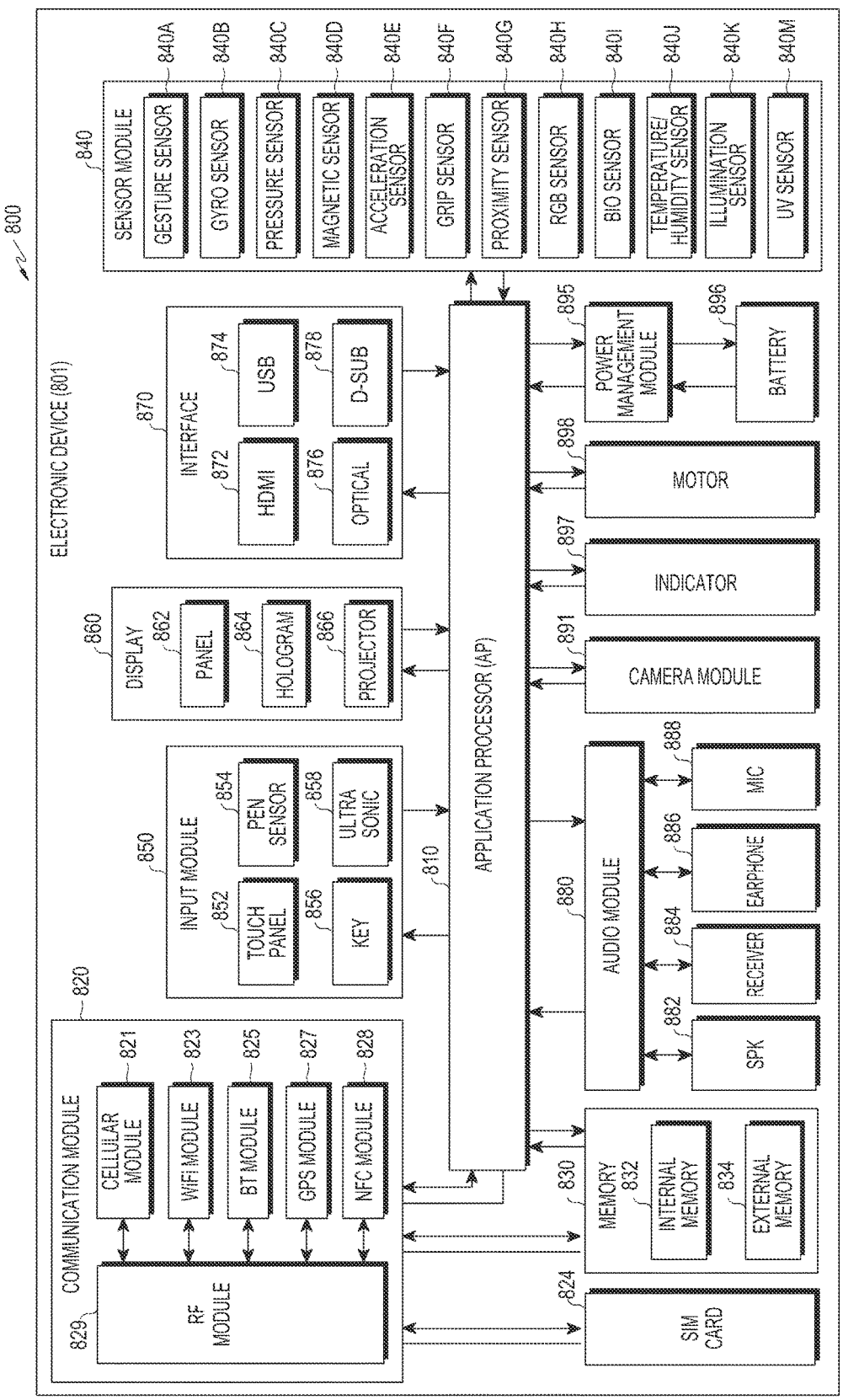
FIG. 9 is a block diagram of an electronic device according to an embodiment of the present disclosure.

FIG. 9 is a block diagram 800 of an electronic device according to an embodiment of the present disclosure. The electronic device 801 may configure all or some of the electronic device illustrated in FIG. 1.

Referring to FIG. 9, the electronic device 801 may include at least one Application Processor (AP) 810, a communication module 820, a Subscriber Identifier Module (SIM) card 824, a memory 830, a sensor module 840, an input device 850, a display 860, an interface 870, an audio module 880, a camera module 891, a power management module 895, a battery 896, an indicator 897, and a motor 898.

The AP 810 control a plurality of hardware or software components connected to the AP 810 by driving an operating system or an application program and process various data including multimedia data and perform calculations. The AP 810 may be implemented by, for example, a System on Chip (SoC). According to various embodiments of the present disclosure, the AP 810 may further include a Graphic Processing Unit (GPU).

The communication module 820 may transmit/receive data in communication between other electronic devices connected to the electronic device 801 through a network. According to various embodiments of the present disclosure, the communication module 820 may include a cellular module 821, a WiFi module 823, a BlueTooth (BT) module 825, a GPS module 827, a Near Field Communication (NFC) module 828, and a Radio Frequency (RF) module 829.

The cellular module 821 may provide a voice, a call, a video call, a Short Message Service (SMS), or an Internet service through a communication network (e.g., Long Term Evolution (LTE), LTE-A, Code Division Multiple Access (CDMA), Wideband CDMA (WCDMA), and/or the like). Further, the cellular module 821 may distinguish and authenticate electronic devices within a communication network by using a subscription identification module (e.g., the SIM card 824). According to various embodiments of the present disclosure, the cellular module 821 may perform at least some of the functions which can provided by the AP 810. For example, the cellular module 821 may perform at least some of the multimedia control functions.

Accordingly, the cellular module 821 may include a Communication Processor (CP). Further, the cellular module 821 may be implemented by, for example, an SoC. Although FIG. 8 illustrates that the components such as the cellular module 821 (e.g., communication processor), the memory 830, and the power management module 895 are separate components of the AP 810, according to various embodiments of the present disclosure, the AP 810 may include at least some of the above described components (e.g., cellular module 821).

According to various embodiments of the present disclosure, the AP 810 or the cellular module 821 (e.g., communication processor) may load a command or data received from at least one of a non-volatile memory and other component elements connected to each of the AP 810 and the cellular module 821 to a volatile memory and process the loaded command or data. Further, the AP 810 or the cellular module 821 may store data received from at least one of other components or generated by at least one of other components in a non-volatile memory.

Each of the WiFi module 823, the BT module 825, the GPS module 827, and the NFC module 828 may include a process for processing data transmitted/received through the corresponding module. In FIG. 8, the cellular module 821, the WiFi module 823, the BT module 825, the GPS module 827, and the NFC module 828 are illustrated as separate blocks, but at least some (e.g., two or more) of the cellular module 821, the WiFi module 823, the BT module 825, the GPS module 827, and the NFC module 828 may be included in one Integrated Chip (IC) or one IC package. For example, at least some (e.g., the communication processor corresponding to the cellular module 821 and the WiFi processor corresponding to the WiFi module 823) of the processors corresponding to the cellular module 821, the WiFi module 823, the BT module 825, the GPS module 827, and the NFC module 828 may be implemented by one SoC.

The RF module 829 may transmit/receive data, for example, an RF signal. Although not illustrated, the RF module 829 may include, for example, a transceiver, a Power Amp Module (PAM), a frequency filter, a Low Noise Amplifier (LNA), and/or the like. Further, the RF module 829 may further include a component for transmitting/receiving electronic waves over a free air space in wireless communication, for example, a conductor, a conducting wire, and/or the like. Although FIG. 8 illustrates that the cellular module 821, the WiFi module 823, the BT module 825, the GPS module 827, and the NFC module 828 share one RF module 829, at least one of the cellular module 821, the WiFi module 823, the BT module 825, the GPS module 827, and the NFC module 828 may transmit/receive an RF signal through a separate RF module.

The SIM card 824 may be a card including a subscriber identification module and may be inserted into a slot formed in a particular portion of the electronic device. The SIM card 824 may include unique identification information (e.g., Integrated Circuit Card IDentifier (ICCID)) or subscriber information (e.g., International Mobile Subscriber Identity (IMSI).

The memory 830 may include an internal memory 832 or an external memory 834. The internal memory 832 may include at least one of a volatile memory (e.g., a Dynamic Random Access Memory (DRAM), a Static RAM (SRAM), a Synchronous Dynamic RAM (SDRAM), and/or the like) or a non-volatile memory (e.g., a One Time Programmable Read Only Memory (OTPROM), a Programmable ROM (PROM), an Erasable and Programmable ROM (EPROM), an Electrically Erasable and Programmable ROM (EEPROM), a mask ROM, a flash ROM, a NAND flash memory, a NOR flash memory, and/or the like).

According to various embodiments of the present disclosure, the internal memory 832 may be a Solid State Drive (SSD). The external memory 834 may further include a flash drive, for example, a Compact Flash (CF), a Secure Digital (SD), a Micro Secure Digital (Micro-SD), a Mini Secure Digital (Mini-SD), an extreme Digital (xD), a memory stick, and/or the like. The external memory 834 may be functionally connected to the electronic device 801 through various interfaces. According to various embodiments of the present disclosure, the electronic device 801 may further include a storage device (or storage medium) such as a hard drive.

The sensor module 840 may measure a physical quantity or detect an operation state of the electronic device 801, and convert the measured or detected information to an electronic signal. The sensor module 840 may include, for example, at least one of a gesture sensor 840A, a gyro sensor 840B, an atmospheric pressure sensor 840C, a magnetic sensor 840D, an acceleration sensor 840E, a grip sensor 840F, a proximity sensor 840G, a color sensor 840H (e.g., red, green, and blue (RGB) sensor), a biometric sensor 840I, a temperature/humidity sensor 840J, an illumination sensor 840K, and a Ultra Violet (UV) sensor 840M. Additionally or alternatively, the sensor module 840 may include, for example, a E-nose sensor (not illustrated), an electromyography (EMG) sensor (not illustrated), an electroencephalogram (EEG) sensor (not illustrated), an electrocardiogram (ECG) sensor (not illustrated), an Infrared (IR) sensor, an iris sensor (not illustrated), a fingerprint sensor, and/or the like. The sensor module 840 may further include a control circuit for controlling one or more sensors included in the sensor module 840.

The input device 850 may include a touch panel 852, a (digital) pen sensor 854, a key 856, or an ultrasonic input device 858. The touch panel 852 may recognize a touch input in at least one scheme among, for example, a capacitive scheme, a resistive scheme, an infrared scheme, an acoustic wave scheme, and/or the like. The touch panel 852 may further include a control circuit. In the capacitive scheme, a physical contact or a proximity recognition is possible. The touch panel 852 may further include a tactile layer. In this event, the touch panel 852 may provide a tactile reaction to the user.

The (digital) pen sensor 854 may be implemented, for example, using a method identical or similar to a method of receiving a touch input of a user, or using a separate recognition sheet. The key 856 may include, for example, a physical button, an optical key or keypad. The ultrasonic input device 858 is a device which can detect an acoustic wave by a microphone (e.g., microphone 888) of the electronic device 801 through an input tool generating an ultrasonic signal to identify (e.g., determine) data and can perform wireless recognition. According to various embodiments of the present disclosure, the electronic device 801 may receive a user input from an external device (e.g., computer or server) connected to the electronic device 200 by using the communication module 820.

The display 860 (e.g., display 150) may include a panel 862, a hologram device 864, and/or a projector 866. For example, the panel 862 may be a Liquid Crystal Display (LCD) or an Active Matrix Organic Light Emitting Diode (AM-OLED). The panel 862 may be implemented to be, for example, flexible, transparent, or wearable. The panel 862 may be configured by the touch panel 852 and one module. The hologram 864 may show a stereoscopic image in the air by using interference of light. The projector 866 may project light on a screen to display an image. For example, the screen may be located inside or outside the electronic device 801. According to various embodiments of the present disclosure, the display 860 may further include a control circuit for controlling the panel 862, the hologram device 864, and/or the projector 866.

The interface 870 may include, for example, a High-Definition Multimedia Interface (HDMI) 872, a Universal Serial Bus (USB) 874, an optical interface 876, or a D-subminiature (D-sub) 878. The interface 870 may be included in, for example, the communication interface 160 illustrated in FIG. 1. Additionally or alternatively, the interface 290 may include, for example, a Mobile High-definition Link (MHL) interface, a Secure Digital (SD)/Multi-Media Card (MMC) interface, an Infrared Data Association (IrDA) standard interface, and/or the like.

The audio module 880 may bi-directionally convert a sound and an electronic signal. At least some components of the audio module 880 may be included in, for example, the input/output interface 140 illustrated in FIG. 1. The audio module 880 (e.g., an audio codec) may convert sound information input or output through, for example, a speaker 882, a receiver 884, an earphone 886, the microphone 888, and/or the like.

The camera module 891 is a device which can photograph an image and a dynamic image. According to an embodiment, the camera module 291 may include one or more image sensors (e.g., a front lens or a back lens), a lens (not shown), an Image Signal Processor (ISP) (not shown) or a flash (not shown) (e.g., LED or xenon lamp).

The power management module 895 may manage power of the electronic device 801. Although not illustrated, the power management module 895 may include, for example, a Power Management Integrated Circuit (PMIC), a charger Integrated Circuit (IC), a battery and/or fuel gauge, and/or the like.

The PMIC may be mounted in, for example, an integrated circuit or an SoC semiconductor. A charging method may be classified into a wired charging method and a wireless charging method. The charger IC may charge a battery and prevent introduction of over-voltage or over-current from a charger. According to various embodiments of the present disclosure, the charger IC may include a charger IC for at least one of the wired charging method and the wireless charging method. A magnetic resonance scheme, a magnetic induction scheme, or an electromagnetic scheme can be exemplified as the wireless charging method, and an additional circuit for wireless charging, such as a coil loop circuit, a resonance circuit, a rectifier circuit, and the like may be added.

The battery fuel gauge may measure, for example, a remaining quantity of the battery 896, or a voltage, a current, or a temperature during the charging. The battery 896 may store or generate electricity and supply power to the electronic device 801 by using the stored or generated electricity. The battery 896 may include, for example, a rechargeable battery or a solar battery.

The indicator 897 may show particular statuses of the electronic device 801 or a part (e.g., AP 810) of the electronic device, for example, a booting status, a message status, a charging status, and/or the like. The motor 898 may convert an electrical signal to a mechanical vibration. Although not illustrated, the electronic device 801 may include a processing unit (e.g., GPU) for supporting a mobile TV. The processing unit for the mobile TV support may process media data according to a standard of Digital Multimedia Broadcasting (DMB), Digital Video Broadcasting (DVB), media flow, and/or the like.

Each of the components of the electronic device according to various embodiments of the present disclosure may be implemented by one or more components and the name of the corresponding component may vary depending on a type of the electronic device. The electronic device according to various embodiments of the present disclosure may include at least one of the components, or some of the components may be omitted or additional another component may be further included. In addition, some of the components of the electronic device according to the present disclosure may be combined to form a single entity, and thus may equivalently execute functions of the corresponding components before being combined.

According to various embodiments of the present disclosure, at least some of the devices (e.g., modules or functions thereof) or the methods (e.g., operations) according to various embodiments of the present disclosure may be implemented by a command stored in a non-transitory computer-readable storage medium in a programming module form. When the command is executed by one or more processors, the one or more processors may perform a function corresponding to the command. The non-transitory computer-readable storage medium may be, for example, the memory 260. At least some of the programming modules may be implemented (e.g., executed) by, for example, the processor. At least some of the programming modules may include, for example, a module, a program, a routine, a set of instructions or a process for performing one or more functions.

The non-transitory computer-readable recording medium may include magnetic media such as a hard disk, a floppy disk, and a magnetic tape, optical media such as a Compact Disc Read Only Memory (CD-ROM) and a Digital Versatile Disc (DVD), magneto-optical media such as a floptical disk, and hardware devices specially configured to store and perform a program instruction (e.g., programming module), such as a Read Only Memory (ROM), a Random Access Memory (RAM), a flash memory, and/or the like. In addition, the program instructions may include high class language codes, which can be executed in a computer by using an interpreter, as well as machine codes made by a compiler. The aforementioned hardware device may be configured to operate as one or more software modules in order to perform the operation of the present disclosure, and vice versa.

The module or the programming module according to various embodiments of the present disclosure may include one or more of the aforementioned components, or some of the components may be omitted or other additional components may be further included. The operations performed by the module, the programming module, or other components according to various embodiments of the present disclosure may be performed by a sequential, parallel, repetitive, or heuristic method. Further, some operations may be executed according to another order or may be omitted, or other operations may be added.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. An electronic device comprising:
    a camera module; and
    a camera control module operatively connected to the camera module,
    wherein the camera control module is configured to:
        obtain focus information of a subject to be captured by using the camera module,
        move a lens of a camera in a movement direction to focus the camera on the subject based on at least the focus information, and
        provide guide information corresponding to the movement direction of the lens through an output device operatively connected to the electronic device.

2. The electronic device of claim 1, wherein the camera module includes one or more phase difference focus sensors and obtains the focus information by using the phase difference focus sensor.

3. The electronic device of claim 1, wherein the camera control module is further configured to determine at least one of a movement distance, the movement direction, and a movement speed of the lens based on the focus information.

4. The electronic device of claim 1, wherein the camera control module is further configured to:
    output an image corresponding to the guide information through a display, and
    differently output the image according to at least one of a movement distance, the movement direction, and a movement speed corresponding to the lens.

5. The electronic device of claim 4, wherein the camera control module is configured to:
    rotate the image in a clockwise direction when the movement direction of the lens is a first direction, and
    rotate the image in a counterclockwise direction when the movement direction of the lens is a second direction.

6. The electronic device of claim 4, wherein the camera control module is further configured to output the image with a different rotation amount according to the movement distance of the lens.

7. The electronic device of claim 4, wherein the camera control module is further configured to output the image with a different rotation speed according to the movement speed of the lens.

8. The electronic device of claim 1,
    wherein the output device includes a vibration module that provides a vibration, and
    wherein the camera control module is further configured to differently output a vibration according to at least one of the movement direction, a movement distance, and a movement speed of the lens.

9. The electronic device of claim 1,
    wherein the output device includes an audio output module that is configured to output a sound, and
    wherein the camera control module is further configured to differently output a sound according to at least one of the movement direction, a movement distance, and a movement speed of the lens.

10. The electronic device of claim 1, wherein the camera control module is further configured to control a depth of field of at least one subject in response to a user input for the image.

11. The electronic device of claim 10, wherein the camera control module is further configured to apply a blur image effect to the at least one subject.

12. A method comprising:
    obtaining focus information of a subject to be captured by using a camera operatively connected to an electronic device;
    moving a lens of the camera in a movement direction to focus the camera on the subject based on at least the focus information; and
    providing guide information corresponding to the movement direction of the lens through an output device operatively connected to the electronic device.

13. The method of claim 12, wherein the moving of the lens comprises:
   determining at least one of a movement distance, the movement direction, and a movement speed of the lens based on the focus information.

14. The method of claim 12, wherein the providing of the guide information comprises:
   providing an image corresponding to the guide information through a display; and
   differently outputting the image according to at least one of a movement distance, the movement direction, and a movement speed corresponding to the lens.

15. The method of claim 14, wherein the differently outputting of the image comprises:
   rotating the image in a clockwise direction when the movement direction of the lens is a first direction; and
   rotating the image in a counterclockwise direction when the movement direction of the lens is a second direction.

16. The method of claim 14, wherein the differently outputting of the image comprises determining a rotation speed of the image according to the movement speed of the lens and displaying the image.

17. The method of claim 12, wherein the providing of the guide information comprises:
   differently outputting a vibration according to at least one of the movement direction, a movement distance, and a movement speed of the lens.

18. A non-transitory computer-readable recording medium recording a program that, when executed, causes at least one processor to perform the operations comprising:
   obtaining focus information of a subject to be captured by using a camera operatively connected to an electronic device;
   moving a lens of the camera in a movement direction to focus the camera on the subject based on at least the focus information; and
   providing guide information corresponding to the movement direction of the lens through an output device operatively connected to the electronic device.

19. The method of claim 12, wherein the providing of the guide information comprises:
   differently outputting a sound according to at least one of the movement direction, a movement distance, and a movement speed of the lens.

20. The method of claim 14, wherein the differently outputting of the image comprises determining a rotation speed of the image according to the movement distance of the lens and displaying the image.

21. The electronic device of claim 1, wherein the camera control module is further configured to determine a depth of field of at least one subject and to output the image with a different size according to the depth of field.

22. The electronic device of claim 12, wherein the camera control module is further configured to determine a depth by using at least one of the focus information, aperture information, and distance information of the at least one subject.

* * * * *